United States Patent
Huang et al.

(10) Patent No.: US 11,742,908 B2
(45) Date of Patent: Aug. 29, 2023

(54) WIRELESS DEVICE COOPERATIVE TRANSMISSION SCHEMES

(71) Applicant: QUALCOMM Incorporated, San Diego, CA (US)

(72) Inventors: Yi Huang, San Diego, CA (US); Prashanth Haridas Hande, San Diego, CA (US); Wei Yang, San Diego, CA (US); Gokul Sridharan, Sunnyvale, CA (US); Wanshi Chen, San Diego, CA (US); Jay Kumar Sundararajan, San Diego, CA (US); Krishna Kiran Mukkavilli, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 485 days.

(21) Appl. No.: 17/075,539

(22) Filed: Oct. 20, 2020

(65) Prior Publication Data

US 2021/0135717 A1    May 6, 2021

Related U.S. Application Data

(60) Provisional application No. 62/930,543, filed on Nov. 4, 2019.

(51) Int. Cl.
*H04B 7/0456* (2017.01)
*G06F 3/14* (2006.01)
(Continued)

(52) U.S. Cl.
CPC ............ *H04B 7/0456* (2013.01); *G06F 3/14* (2013.01); *H04L 1/0002* (2013.01); *H04L 5/0048* (2013.01); *H04W 72/21* (2023.01)

(58) Field of Classification Search
None
See application file for complete search history.

(56) References Cited

U.S. PATENT DOCUMENTS 11,038,612 B2 *    6/2021    Yokomakura ......... H04L 1/0039
2015/0257118 A1 *  9/2015    Siomina ................ H04B 17/21
                                                            455/456.1
(Continued)

FOREIGN PATENT DOCUMENTS

WO    WO-2019031085 A1 *  2/2019    ........ H04W 72/0406

OTHER PUBLICATIONS

Huawei et al., "Further Views on Rel-17 Work Area on NR Sidelink Enhancements for V2X and Other Use Cases", 3GPP Draft, 3GPP TSG RAN Meeting #85, RP-191831, 3rd Generation Partnership Project (3GPP), Mobile Competence Centre, 650, Route Des Lucioles, F-06921 Sophia-Antipolis Cedex, France, vol. TSG RAN No. Newport Beach USA, Sep. 16, 2019-Sep. 20, 2019, Sep. 9, 2019 (Sep. 9, 2019), XP051782380, 13 Pages, Retrieved from the Internet: URL: http://www.3gpp.org/ftp/tsg_ran/TSG_RAN/TSGR_85/Docs/RP-191831.zip [retrieved on Sep. 9, 2019], p. 5, paragraph 2.1.2.3, Section 2.2.2, figure 9.

(Continued)

*Primary Examiner* — Edan Orgad
*Assistant Examiner* — Emmanuel K Maglo
(74) *Attorney, Agent, or Firm* — Holland & Hart LLP

(57) ABSTRACT

Methods, systems, and devices for wireless communications are described. Generally, the described techniques provide for efficiently transmitting uplink signals to a base station using shared antennas. A first device may be in communications with a base station using local antennas and may identify a second device having auxiliary antennas available for transmitting uplink signals to the base station. Because the local antennas and auxiliary antennas may have different capabilities (e.g., due to different power or other constraints), the first device may generate first uplink signals for transmission using the local antennas differently from second uplink signals for transmission using the auxiliary (Continued)

antennas. The first device may transmit the first uplink signals to the base station using the local antennas and transmit the second uplink signals to the second device for transmission to the base station using the auxiliary antennas based on different configurations.

30 Claims, 16 Drawing Sheets

(51) Int. Cl.
  *H04L 5/00* (2006.01)
  *H04L 1/00* (2006.01)
  *H04W 72/21* (2023.01)

(56) References Cited

U.S. PATENT DOCUMENTS

| | | | | |
|---|---|---|---|---|
| 2015/0381310 | A1* | 12/2015 | Hammarwall | H04L 1/0026 370/329 |
| 2016/0081073 | A1* | 3/2016 | Lindoff | H04W 72/51 370/329 |
| 2016/0323912 | A1* | 11/2016 | Nakamura | H04B 7/0626 |
| 2017/0288897 | A1* | 10/2017 | You | G01S 5/0252 |
| 2019/0182096 | A1* | 6/2019 | Bin Sediq | H04L 1/0004 |
| 2019/0245646 | A1* | 8/2019 | Robert Safavi | H04L 1/0061 |
| 2019/0261357 | A1* | 8/2019 | Lu | H04W 72/21 |
| 2019/0373588 | A1* | 12/2019 | Bae | H04L 5/0091 |
| 2019/0384380 | A1* | 12/2019 | Woo | G06V 20/20 |
| 2019/0384383 | A1* | 12/2019 | Lee | G06F 3/011 |
| 2019/0384977 | A1* | 12/2019 | Woo | G06V 20/20 |
| 2019/0385376 | A1* | 12/2019 | Kim | G06F 3/0482 |
| 2020/0351537 | A1* | 11/2020 | Browy | H04N 21/41407 |
| 2021/0127402 | A1* | 4/2021 | Lee | H04W 72/56 |

OTHER PUBLICATIONS

International Search Report and Written Opinion—PCT/US2020/056633—ISA/EPO—dated Feb. 8, 2021.
ZTE et al., "New SID on User Virtualization and Cooperation", 3GPP Draft, 3GPP TSG-RAN#84, RP-191078 New SID on User Virtualization and Cooperation, 3rd Generation Partnership Project (3GPP), Mobile Competence Centre, 650, Route Des Lucioles, F-06921 Sophia-Antipolis Cedex, F, vol. TSG RAN Jun. 2, 2019 (Jun. 2, 2019), XP051747290, 4 Pages, Retrieved from the Internet: URL:http://www.3gpp.org/ftp/Meetings%5F3GPP%5FSYNC/RAN/Docs/RP%2D191078%2Ezip [retrieved on Jun. 2, 2019] Section 3.
ZTE: "ZTE's View on Rel-17", 3GPP Draft, RP-191080 ZTE's View on Rel17, 3rd Generation Partnership Project (3GPP), Mobile Competence Centre, 650, Route Des Lucioles, F-06921 Sophia-Antipolis Cedex, France, vol. TSG RAN May 27, 2019 (May 27, 2019), XP051739364, 37 Pages, Retrieved from the Internet:URL:http://www.3gpp.org/ftp/tsg%5Fran/TSG%5FRAN/TSGR%5F84/Docs/RP%2D191080%2Ezip [retrieved on May 27, 2019] Slides 18, 19, 22-25, 34, 35.

\* cited by examiner

WIRELESS DEVICE COOPERATIVE TRANSMISSION SCHEMES

CROSS REFERENCE

The present application for patent claims the benefit of U.S. Provisional Patent Application No. 62/930,543 by HUANG et al., entitled "WIRELESS DEVICE COOPERATIVE TRANSMISSION SCHEMES," filed Nov. 4, 2019, assigned to the assignee hereof, and expressly incorporated by reference herein.

BACKGROUND

The following relates generally to wireless communications and more specifically to wireless device cooperative transmission schemes.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long-Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM).

A wireless multiple-access communications system may include a number of base stations or network access nodes, each simultaneously supporting communication for multiple communication devices, which may be otherwise known as user equipment (UE). In some wireless communications systems, an extended reality (XR) device (or other device) may connect to a UE.

SUMMARY

The described techniques relate to improved methods, systems, devices, and apparatuses that support wireless device cooperative transmission schemes. Generally, the described techniques provide for efficiently transmitting uplink signals to a base station using shared antennas. A first device may be in communication with a base station using local antennas and may identify a second device having auxiliary antennas available for transmitting uplink signals to the base station. Because the local antennas and auxiliary antennas may have different capabilities (e.g., due to different power or other constraints), the first device may generate first uplink signals for transmission using the local antennas differently from second uplink signals for transmission using the auxiliary antennas. Specifically, the first device may generate first uplink signals for transmission using local antennas according to a first configuration and second uplink signals for transmission using auxiliary antennas according to a second configuration. The first device may transmit the first uplink signals to the base station using the local antennas and transmit samples of the second uplink signals (or alternatively the second uplink signals) to the second device for transmission to the base station using the auxiliary antennas.

In some wireless communications systems, a device, such as an extended reality (XR) device (or other device) may connect to another device, such as a user equipment (UE), using one of a number of tethering options, including a universal serial bus (USB) link, a Bluetooth link, a Wi-Fi link, a fifth generation (5G) sidelink, or some combination of these or other tethering options. In some such systems, it may be appropriate for both the UE and the XR device to communicate with a base station while the devices are connected to each other. Improved techniques for facilitating communications between a UE, an XR device, and a base station may be desirable.

A method for wireless communication at a first device is described. The method may include communicating with a base station over a first communication link using a set of local antennas, identifying a second device having a set of auxiliary antennas for transmitting uplink signals to the base station, where the first device is in communication with the second device over a second communication link, receiving, from the base station, a control message indicating a first configuration for generating first uplink signals for transmission to the base station by the first device and a second configuration for generating second uplink signals for transmission to the base station by the second device, transmitting, over the first communication link, the first uplink signals to the base station using the set of local antennas based on the first configuration, and transmitting, over the second communication link, samples of the second uplink signals to the second device for transmission of the second uplink signals to the base station over the first communication link using the set of auxiliary antennas based on the second configuration.

An apparatus for wireless communication at a first device is described. The apparatus may include a processor, memory coupled with the processor, and instructions stored in the memory. The instructions may be executable by the processor to cause the apparatus to communicate with a base station over a first communication link using a set of local antennas, identify a second device having a set of auxiliary antennas for transmitting uplink signals to the base station, where the first device is in communication with the second device over a second communication link, receive, from the base station, a control message indicating a first configuration for generating first uplink signals for transmission to the base station by the first device and a second configuration for generating second uplink signals for transmission to the base station by the second device, transmit, over the first communication link, the first uplink signals to the base station using the set of local antennas based on the first configuration, and transmit, over the second communication link, samples of the second uplink signals to the second device for transmission of the second uplink signals to the base station over the first communication link using the set of auxiliary antennas based on the second configuration.

Another apparatus for wireless communication at a first device is described. The apparatus may include means for communicating with a base station over a first communication link using a set of local antennas, identifying a second device having a set of auxiliary antennas for transmitting uplink signals to the base station, where the first device is in communication with the second device over a second communication link, receiving, from the base station, a control message indicating a first configuration for generating first uplink signals for transmission to the base station by the first device and a second configuration for generating second uplink signals for transmission to the base station by the second device, transmitting, over the first communication link, the first uplink signals to the base station using the set of local antennas based on the first configuration, and transmitting, over the second communication link, samples of the second uplink signals to the second device for transmission of the second uplink signals to the base station over the first communication link using the set of auxiliary antennas based on the second configuration.

A non-transitory computer-readable medium storing code for wireless communication at a first device is described. The code may include instructions executable by a processor to communicate with a base station over a first communication link using a set of local antennas, identify a second device having a set of auxiliary antennas for transmitting uplink signals to the base station, where the first device is in communication with the second device over a second communication link, receive, from the base station, a control message indicating a first configuration for generating first uplink signals for transmission to the base station by the first device and a second configuration for generating second uplink signals for transmission to the base station by the second device, transmit, over the first communication link, the first uplink signals to the base station using the set of local antennas based on the first configuration, and transmit, over the second communication link, samples of the second uplink signals to the second device for transmission of the second uplink signals to the base station over the first communication link using the set of auxiliary antennas based on the second configuration.

In some examples of the method, apparatuses, and non-transitory computer-readable medium described herein, the first configuration may include operations, features, means, or instructions for modulating the first uplink signals for transmission to the base station by the first device based on the first modulation order, and modulating the second uplink signals for transmission to the base station by the second device based on the second modulation order. In some examples of the method, apparatuses, and non-transitory computer-readable medium described herein, the first configuration may include operations, features, means, or instructions for encoding the first uplink signals for transmission to the base station by the first device based on the first code rate, and encoding the second uplink signals for transmission to the base station by the second device based on the second code rate. In some examples of the method, apparatuses, and non-transitory computer-readable medium described herein, the first configuration may include operations, features, means, or instructions for precoding the first uplink signals for transmission to the base station by the first device using the first precoder, and precoding the second uplink signals for transmission to the base station by the second device using the second precoder.

Some examples of the method, apparatuses, and non-transitory computer-readable medium described herein may further include operations, features, means, or instructions for receiving, in the control message, a single field indicating a joint precoder of a set of joint precoders, the joint precoder including the first precoder for the first device and the second precoder for the second device. Some examples of the method, apparatuses, and non-transitory computer-readable medium described herein may further include operations, features, means, or instructions for receiving, in the control message, a first field indicating the first precoder for the first device and a second field indicating the second precoder for the second device. In some examples of the method, apparatuses, and non-transitory computer-readable medium described herein, the first uplink signals include first sounding reference signals, and the second uplink signals include second sounding reference signals.

In some examples of the method, apparatuses, and non-transitory computer-readable medium described herein, the first configuration includes a first sounding reference signal bandwidth, a first sounding reference signal comb size, a first sounding reference signal sequence, a first number of sounding reference signal ports, or any combination thereof, and the second configuration includes a second sounding reference signal bandwidth, a second sounding reference signal comb size, a second sounding reference signal sequence, a second number of sounding reference signal ports, or any combination thereof. In some examples of the method, apparatuses, and non-transitory computer-readable medium described herein, the first sounding reference signals and the second sounding reference signals may be transmitted on different sounding reference signal resources.

In some examples of the method, apparatuses, and non-transitory computer-readable medium described herein, the second communication link includes USB link, a Bluetooth link, a Wi-Fi link, or a 5G sidelink. In some examples of the method, apparatuses, and non-transitory computer-readable medium described herein, the first device may be a first UE, a first head mounted display, a first XR device, a first augmented reality (AR) device, a first virtual reality (VR) device, or a first wearable device, and the second device may be a second UE, a second head mounted display, a second XR device, a second AR device, a second VR device, or a second wearable device. In some examples of the method, apparatuses, and non-transitory computer-readable medium described herein, the first device includes a 5G modem, and the second device includes an antenna and radio frequency (RF) front-end. In some examples of the method, apparatuses, and non-transitory computer-readable medium described herein, the samples of the second uplink signals include in-phase and quadrature samples of the second uplink signals.

A method of wireless communication at a base station is described. The method may include receiving, from a first device over a first communication link, an indication that a set of local antennas of the first device and a set of auxiliary antennas of a second device are to be used to transmit uplink signals to the base station, where the first device is in communication with the second device over a second communication link, transmitting a control message to the first device indicating a first configuration for the first device to use to generate first uplink signals for transmission to the base station using the set of local antennas and a second configuration for the first device to use to generate second uplink signals for transmission to the base station using the set of auxiliary antennas, and receiving the first uplink signals from the first device and the second uplink signals from the second device based on transmitting the control message.

An apparatus for wireless communication at a base station is described. The apparatus may include a processor, memory coupled with the processor, and instructions stored in the memory. The instructions may be executable by the processor to cause the apparatus to receive, from a first device over a first communication link, an indication that a set of local antennas of the first device and a set of auxiliary antennas of a second device are to be used to transmit uplink signals to the base station, where the first device is in communication with the second device over a second communication link, transmit a control message to the first device indicating a first configuration for the first device to use to generate first uplink signals for transmission to the base station using the set of local antennas and a second configuration for the first device to use to generate second uplink signals for transmission to the base station using the set of auxiliary antennas, and receive the first uplink signals from the first device and the second uplink signals from the second device based on transmitting the control message.

Another apparatus for wireless communication at a base station is described. The apparatus may include means for receiving, from a first device over a first communication link, an indication that a set of local antennas of the first device and a set of auxiliary antennas of a second device are to be used to transmit uplink signals to the base station, where the first device is in communication with the second device over a second communication link, transmitting a control message to the first device indicating a first configuration for the first device to use to generate first uplink signals for transmission to the base station using the set of local antennas and a second configuration for the first device to use to generate second uplink signals for transmission to the base station using the set of auxiliary antennas, and receiving the first uplink signals from the first device and the second uplink signals from the second device based on transmitting the control message.

A non-transitory computer-readable medium storing code for wireless communication at a base station is described. The code may include instructions executable by a processor to receive, from a first device over a first communication link, an indication that a set of local antennas of the first device and a set of auxiliary antennas of a second device are to be used to transmit uplink signals to the base station, where the first device is in communication with the second device over a second communication link, transmit a control message to the first device indicating a first configuration for the first device to use to generate first uplink signals for transmission to the base station using the set of local antennas and a second configuration for the first device to use to generate second uplink signals for transmission to the base station using the set of auxiliary antennas, and receive the first uplink signals from the first device and the second uplink signals from the second device based on transmitting the control message.

In some examples of the method, apparatuses, and non-transitory computer-readable medium described herein, the first configuration may include operations, features, means, or instructions for demodulating the first uplink signals received from the first device based on the first modulation order, and demodulating the second uplink signals received from the second device based on the second modulation order. In some examples of the method, apparatuses, and non-transitory computer-readable medium described herein, the first configuration may include operations, features, means, or instructions for decoding the first uplink signals received from the first device based on the first code rate, and decoding the second uplink signals received from the second device based on the second code rate.

In some examples of the method, apparatuses, and non-transitory computer-readable medium described herein, the first configuration may include operations, features, means, or instructions for decoding the first uplink signals received from the first device based on the first uplink signals being precoded using the first precoder, and decoding the second uplink signals received from the second device based on the second uplink signals being precoded using the second precoder. Some examples of the method, apparatuses, and non-transitory computer-readable medium described herein may further include operations, features, means, or instructions for transmitting, in the control message, a single field indicating a joint precoder of a set of joint precoders, the joint precoder including the first precoder for the first device and the second precoder for the second device.

Some examples of the method, apparatuses, and non-transitory computer-readable medium described herein may further include operations, features, means, or instructions for transmitting, in the control message, a first field indicating the first precoder for the first device and a second field indicating the second precoder for the second device. In some examples of the method, apparatuses, and non-transitory computer-readable medium described herein, the first uplink signals include first sounding reference signals, and the second uplink signals include second sounding reference signals. In some examples of the method, apparatuses, and non-transitory computer-readable medium described herein, the first configuration includes a first sounding reference signal bandwidth, a first sounding reference signal comb size, a first sounding reference signal sequence, a first number of sounding reference signal ports, or a combination thereof, and the second configuration includes a second sounding reference signal bandwidth, a second sounding reference signal comb size, a second sounding reference signal sequence, a second number of sounding reference signal ports, or a combination thereof.

In some examples of the method, apparatuses, and non-transitory computer-readable medium described herein, the first sounding reference signals and the second sounding reference signals may be transmitted on different sounding reference signal resources. In some examples of the method, apparatuses, and non-transitory computer-readable medium described herein, the second communication link includes USB link, a Bluetooth link, a Wi-Fi link, or a 5G sidelink. In some examples of the method, apparatuses, and non-transitory computer-readable medium described herein, the first device may be a first UE, a first head mounted display, a first XR device, a first AR device, a first VR device, or a first wearable device, and the second device may be a second UE, a second head mounted display, a second XR device, a second AR device, a second VR device, or a second wearable device. In some examples of the method, apparatuses, and non-transitory computer-readable medium described herein, the first device includes a 5G modem, and the second device includes an antenna and RF front-end.

A method of wireless communication at a first device is described. The method may include communicating with a base station over a first communication link using a set of local antennas, identifying a second device having a set of auxiliary antennas for transmitting uplink signals to the base station, where the first device is in communication with the second device over a second communication link, coordinating with the second device to generate uplink signals for joint transmission to the base station using the set of local antennas of the first device and the set of auxiliary antennas of the second device, and transmitting, over the first communication link, the uplink signals to the base station using the set of local antennas of the first device and the set of auxiliary antennas of the second device based on the coordinating.

An apparatus for wireless communication at a first device is described. The apparatus may include a processor, memory coupled with the processor, and instructions stored in the memory. The instructions may be executable by the processor to cause the apparatus to communicate with a base station over a first communication link using a set of local antennas, identify a second device having a set of auxiliary antennas for transmitting uplink signals to the base station, where the first device is in communication with the second device over a second communication link, coordinate with the second device to generate uplink signals for joint transmission to the base station using the set of local antennas of the first device and the set of auxiliary antennas of the second device, and transmit, over the first communication link, the uplink signals to the base station using the set of local antennas of the first device and the set of auxiliary antennas of the second device based on the coordinating.

Another apparatus for wireless communication at a first device is described. The apparatus may include means for communicating with a base station over a first communication link using a set of local antennas, identifying a second device having a set of auxiliary antennas for transmitting uplink signals to the base station, where the first device is in communication with the second device over a second communication link, coordinating with the second device to generate uplink signals for joint transmission to the base station using the set of local antennas of the first device and the set of auxiliary antennas of the second device, and transmitting, over the first communication link, the uplink signals to the base station using the set of local antennas of the first device and the set of auxiliary antennas of the second device based on the coordinating.

A non-transitory computer-readable medium storing code for wireless communication at a first device is described. The code may include instructions executable by a processor to communicate with a base station over a first communication link using a set of local antennas, identify a second device having a set of auxiliary antennas for transmitting uplink signals to the base station, where the first device is in communication with the second device over a second communication link, coordinate with the second device to generate uplink signals for joint transmission to the base station using the set of local antennas of the first device and the set of auxiliary antennas of the second device, and transmit, over the first communication link, the uplink signals to the base station using the set of local antennas of the first device and the set of auxiliary antennas of the second device based on the coordinating.

In some examples of the method, apparatuses, and non-transitory computer-readable medium described herein, coordinating with the second device may include operations, features, means, or instructions for identifying a precoding scheme for precoding the uplink signals for joint transmission to the base station, and precoding the uplink signals for joint transmission to the base station based on the precoding scheme, where a phase coherence between the set of local antennas and the set of auxiliary antennas may be within a threshold. In some examples of the method, apparatuses, and non-transitory computer-readable medium described herein, coordinating with the second device may include operations, features, means, or instructions for identifying a transmit power split for the joint transmission to the base station, where the transmit power split may be between a first transmit power for transmitting on the set of local antennas and a second transmit power for transmitting on the set of auxiliary antennas, and transmitting the uplink signals to the base station using the set of local antennas and the set of auxiliary antennas based on the transmit power split.

DETAILED DESCRIPTION

Figure 1:
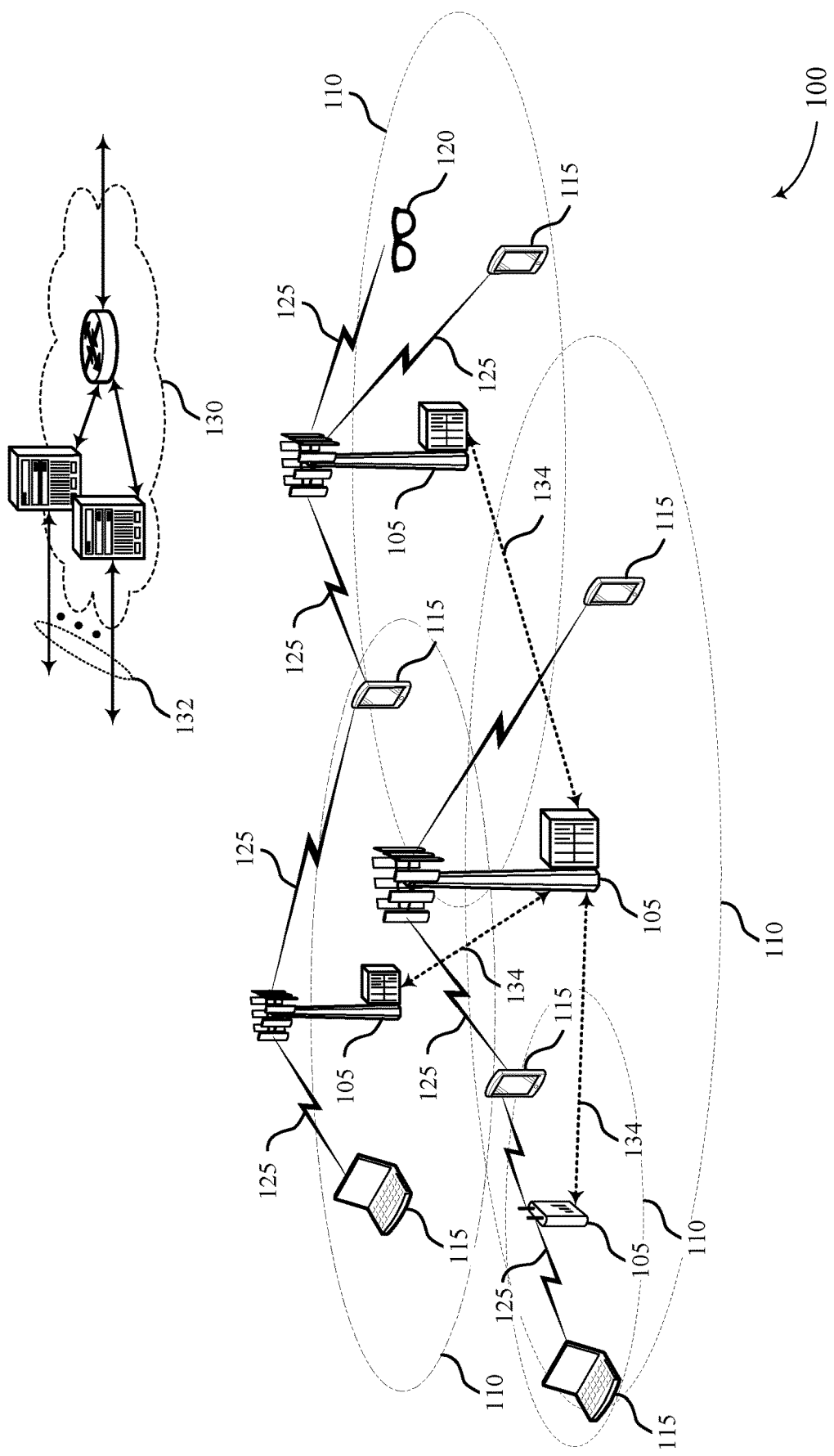
FIG. 1 illustrates an example of a wireless communications system that supports wireless device cooperative transmission schemes in accordance with aspects of the present disclosure.

In some wireless communications systems, a user equipment (UE) may be connected to a base station, and an extended reality (XR) device may be in communication with (e.g., be tethered to) the UE. In some such systems, the UE may be configured to generate and transmit uplink signals to the base station via one or more local antennas (e.g., physical antennas, antenna arrays, or both at the UE) and via one or more auxiliary antennas (e.g., physical antennas, antenna arrays, or both at the XR device). Alternatively, if the XR device has a modem, the XR device may be configured to generate and transmit uplink signals to the base station via one or more local antennas (e.g., physical antennas, antenna arrays, or both at the XR device) and via one or more auxiliary antennas (e.g., physical antennas, antenna arrays, or both at the UE). That is, to improve throughput, a first device may be configured to transmit uplink signals via one or more local antennas at the first device and via one or more auxiliary antennas at the second device. In some cases, however, the first device may be limited to a single configuration for uplink transmissions to a base station. In such cases, because local antennas at the first device and auxiliary antennas at the second device may have different capabilities or different constraints, the use of a single configuration for generating uplink signals may result in loss of throughput.

As an example, the local antennas of a first device may be capable of transmitting with a higher power than auxiliary antennas. In this example, if a first device modulates uplink signals for transmission to a base station according to a modulation order configured based on the capability of the local antennas, the uplink signals transmitted by auxiliary antennas with the modulation order may be transmitted with a power that is lower than expected, resulting in loss of throughput because the base station may not be able to properly decode the uplink signals. Alternatively, if the first device modulates uplink signals for transmission to a base station according to a modulation order configured based on the capability of the auxiliary antennas, the uplink signals transmitted by local antennas may not take advantage of the full capacity of the local antennas, resulting in loss of throughput.

As described herein, wireless devices may support efficient techniques for transmitting uplink signals to a base station using shared antennas. In particular, a first device may identify different configurations for transmitting uplink signals on local and auxiliary antennas (e.g., where the different configurations may be based on the different capabilities of the local and auxiliary antennas). For example, the first device may receive an indication of a first configuration for generating uplink signals for transmission using one or more local antennas and a second configuration for generating uplink signals for transmission using one or more auxiliary antennas. The first device may generate first and second signals using the first and second configurations, respectively, and the first device may transmit one or more first uplink signals to the base station using the one or more local antennas and transmit one or more samples of the one or more second uplink signals (or alternatively the one or more second uplink signals) to the second device for transmission to the base station using the one or more auxiliary antennas.

Aspects of the disclosure introduced above are initially described in the context of a wireless communications system. Examples of processes and signaling exchanges that support wireless device cooperative transmission schemes are then described. Aspects of the disclosure are further illustrated by and described with reference to apparatus diagrams, system diagrams, and flowcharts that relate to wireless device cooperative transmission schemes.

FIG. 1 illustrates an example of a wireless communications system 100 that supports wireless device cooperative transmission schemes in accordance with aspects of the present disclosure. The wireless communications system 100 includes base stations 105, UEs 115, wireless devices 120, and a core network 130. In some examples, the wireless communications system 100 may be a Long-Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 or wireless devices 120 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 and wireless devices 120 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 and wireless devices 120 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 or wireless device 120 to a base station 105 or downlink transmissions from a base station 105 to a UE 115 or wireless device 120. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" may refer to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

The term "carrier" may refer to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)) and may be positioned according to a channel raster for discovery by UEs 115. Carriers may be downlink or uplink (e.g., in a frequency division duplexing (FDD) mode), or be configured to carry downlink and uplink communications (e.g., in a time division duplexing (TDD) mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

UEs 115 or wireless devices 120 may be dispersed throughout the wireless communications system 100, and each UE 115 or wireless device 120 may be stationary or mobile. A UE 115 may also be referred to as a mobile device, a wireless device (i.e., a wireless device 120 may be an example of a UE 115), a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz. Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on FDD, TDD, or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $Ts=1/30,720,000$ seconds. Time intervals of a communications resource may be organized according to radio frames each having a duration of 10 milliseconds (ms), where the frame period may be expressed as $Tf=307,200$ Ts. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100 and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In wireless communications system 100, a UE 115 may be connected to a base station 105 over a first communication link, and a wireless device 120 may be tethered to the UE 115 over a second communication link. The first communication link may be an example of a link formed upon completion of a successful connection procedure (e.g., RRC connection procedure) between the UE 115 and the base station 105, and the second communication link may be a universal serial bus (USB) link, Bluetooth link, Wi-Fi link, Wi-Fi-D link, or 5G sidelink. The wireless device 120 may be an example of an XR device, an augmented reality (AR) device, a virtual reality (VR) device, a head mounted device (HMD), a wearable device, or some combination of these or other wireless devices.

Figure 2:
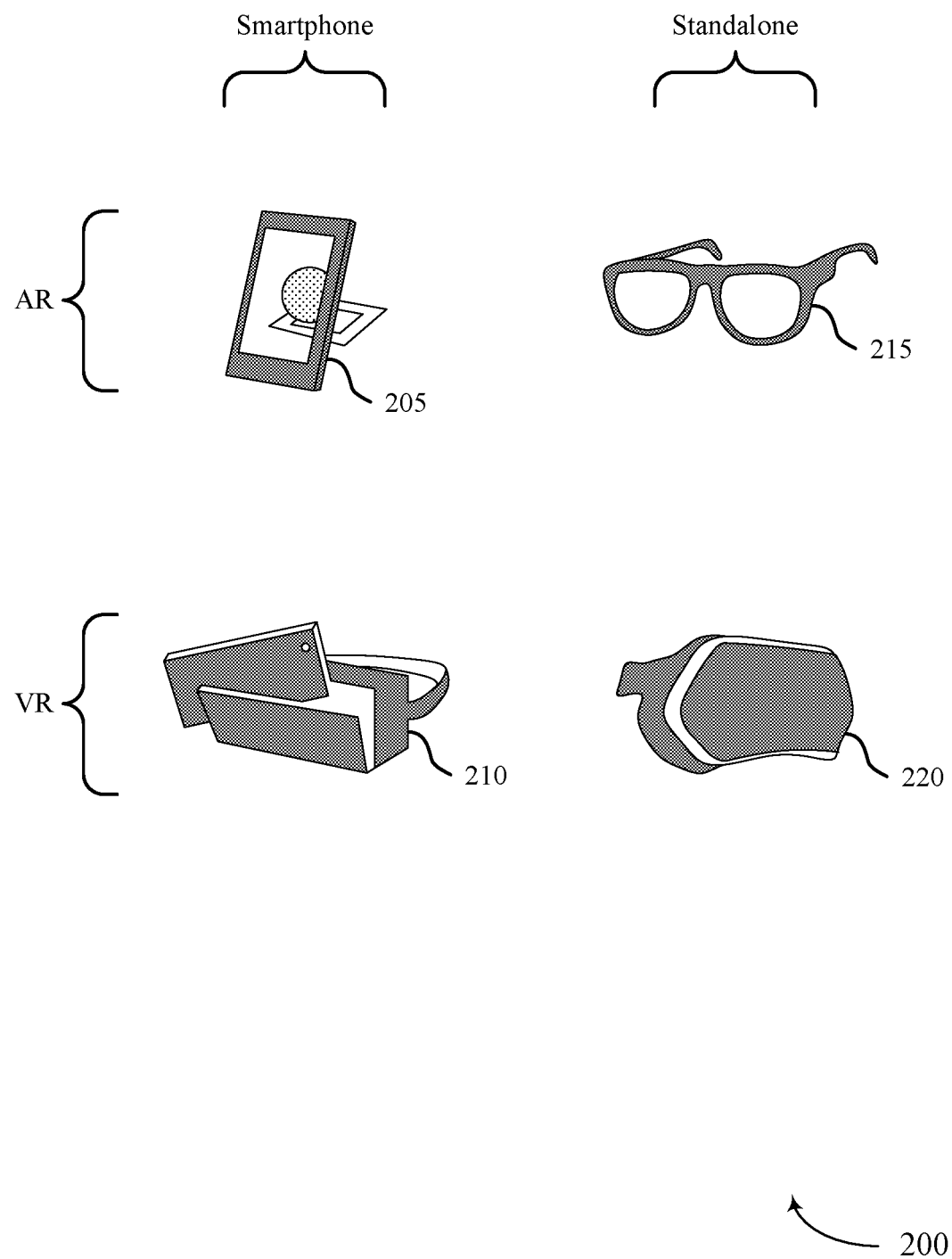
FIG. 2 illustrates examples of augmented reality (AR) and virtual reality (VR) devices categorized as smartphones or standalone devices in accordance with aspects of the present disclosure.

FIG. 2 illustrates examples of AR and VR devices 200 categorized as smartphones or standalone devices in accordance with aspects of the present disclosure. As described above, these AR and VR devices may be tethered to other smartphones, personal computers (PCs), or consoles (not shown). For example, a wireless communications system may support a smartphone-based AR device 205, a smartphone-based VR device 210, a standalone AR device 215, a standalone VR device 220, or any combination thereof. The smartphone-based AR device 205, the smartphone-based VR device 210, the standalone AR device 215, the standalone VR device 220, or any combination thereof may be examples of wireless devices 120 as described herein.

In some cases, the form-factor of a wireless device 120 (e.g., an XR HMD) may impose limitations on the number of feasible or accessible antennas on the wireless device 120 available for uplink transmissions. For example, the wireless device 120 may not have room to support more than two antennas for uplink transmissions. Similarly, the form-factor of a UE 115 (e.g., a smartphone) may limit the number of antennas available for uplink transmissions. For instance, an eight antenna UE 115 design may be challenging since the antennas at the UE 115 may be used to support Wi-Fi, Bluetooth, 5G, 4G, 3G, and other transmissions. As described herein, to improve throughput in wireless communications system 100, the antennas of a wireless device 120 may be used to support transmissions from a UE 115, or the antennas of a UE 115 may be used to support transmissions from a wireless device 120.

Using antenna sharing, the antennas at a UE 115 and a wireless device 120 may be effectively combined to achieve diversity gain, rank gain, or selection gain. Diversity gain may be achieved because an uplink transmission may be across multiple antennas, and the antenna sharing may, in some cases, be transparent to the network. Rank gain may be achieved because a device may have access to more antennas and may signal a higher capability to the network. For example, four total antennas may be used for an uplink transmission by a device, where the device has access to two local antennas and two auxiliary antennas at another device. Selection gain may be achieved because a device may be able to select antennas (e.g., two antennas) from the total number of local antennas at the device and auxiliary antennas at another device. In some cases, the antennas at the UE 115 and the wireless device 120 may or may not be time or phase synchronized.

In some aspects, a UE 115 may be configured to generate and transmit uplink signals to a base station 105 via local antennas at the UE 115 and auxiliary antennas at a wireless device 120. Alternatively, if the wireless device 120 has a modem, the wireless device 120 may be configured to generate and transmit uplink signals to the base station 105 via local antennas at the wireless device 120 and auxiliary antennas at the UE 115. Thus, a wireless device 120 may provide additional antennas to a UE 115 for uplink transmissions to a base station 105, or a UE 115 may provide additional antennas to a wireless device 120 for uplink transmission to a base station 105. Local antennas at a device may refer to physical antennas located at that device, and auxiliary antennas at a device may refer to physical antennas located at the device and available to be shared between devices (or used by another device) for transmissions to a base station 105.

Figure 3:
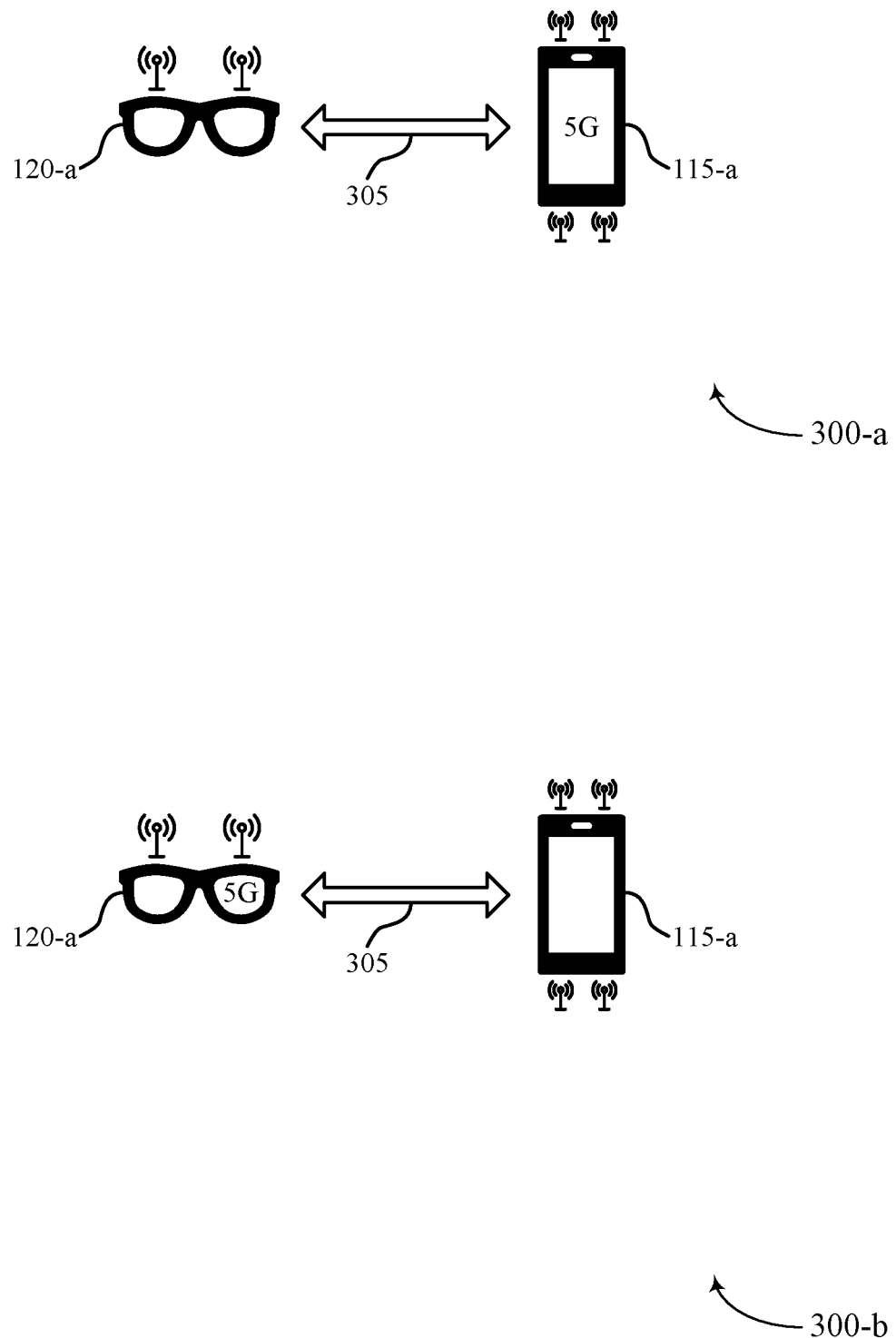
FIG. 3 illustrates examples of antenna sharing in accordance with aspects of the present disclosure.

FIG. 3 illustrates examples of antenna sharing 300 in accordance with aspects of the present disclosure. In the example of FIG. 3, a wireless device 120-a may be tethered to a UE 115-a over a communication link 305 (e.g., a USB link). As shown, the UE 115-a (e.g., 5G phone) may be equipped with four antennas to support up to four layers of uplink transmissions, and an additional two antennas may be provided by the wireless device 120-a. In a first example of antenna sharing 300-a, UE 115-a may include a 5G modem, and wireless device 120-a may not have a 5G modem. Thus, the antennas on the wireless device 120-a may be used by the UE 115-a for uplink transmissions to a base station 105 (e.g., the wireless device 120-a may cooperate or share antennas with UE 115-a to improve performance). In a second example of antenna sharing 300-b, wireless device 120-a may include a 5G modem (e.g., where the 5G modem at the UE 115-a may not be used to generate signals for transmission on shared antennas between the UE 115-a and wireless device 120-a). Thus, the antennas or a subset of the antennas on UE 115-a may be used by the wireless device 120-a for uplink transmissions to a base station 105 (e.g., the UE 115-a may cooperate or share antennas with wireless device 120-a to improve performance).

A device used to generate uplink signals for transmission on local antennas and auxiliary antennas may be referred to as a first device, and a device used to provide auxiliary antennas to the first device may be referred to as a second device. The first device may be configured with a modem for generating first uplink signals for transmission to a base station 105 on local antennas and for generating samples of second uplink signals (e.g., in-phase and quadrature (IQ) samples) to send to the second device for transmission to the base station 105 on auxiliary antennas. The second device may be configured with the auxiliary antennas, a power amplifier, a radio frequency (RF) front-end, an analog to digital converter (ADC), a digital to analog converter (DAC), etc. for upconverting and amplifying the samples of the second uplink signals for transmission to a base station 105. In some cases, the first device may compress the samples of the second uplink signals before sending the samples to the second device (e.g., when a relatively high number of antennas—for example, above a threshold—is available at the second device and the size of the samples is relatively large—for example, above a threshold size—or when the tethering option used for the connection between the first and second devices supports low throughput).

In some cases, even though a first device may be capable of transmitting uplink signals using local antennas and auxiliary antennas, the first device may be limited to a single configuration for uplink transmissions to a base station 105. In such cases, because local antennas at the first device and auxiliary antennas at the second device may have different capabilities or different constraints, the use of a single configuration for generating uplink signals may result in loss of throughput. For instance, the power class associated with the power amplifier at an XR HMD may be much lower than the power class associated with the power amplifier at a UE 115. In particular, each of the four antennas at UE 115-a may be powered by a power amplifier of 23 dBm (e.g., power class 3), and each of the two antennas at wireless device 120-a may be powered by a power amplifier of 14 dBm.

Thus, if UE 115-a modulates uplink signals for transmission to a base station 105 according to a modulation order configured based on the capability of the local antennas at UE 115-a, the uplink signals transmitted with this modulation order by wireless device 120-a using the auxiliary antennas may be transmitted with a power that is lower than expected, resulting in loss of throughput because a receiving base station 105 may not be able to properly decode the uplink signals. Alternatively, if UE 115-a modulates uplink signals for transmission to a receiving base station 105 according to a modulation order configured based on the capability of the auxiliary antennas, the uplink signals transmitted with this modulation order by local antennas may not take advantage of the full capacity of the local antennas, resulting in loss of throughput. As described herein, wireless devices may support efficient techniques for transmitting uplink signals to a base station 105 using shared antennas.

Figure 4:
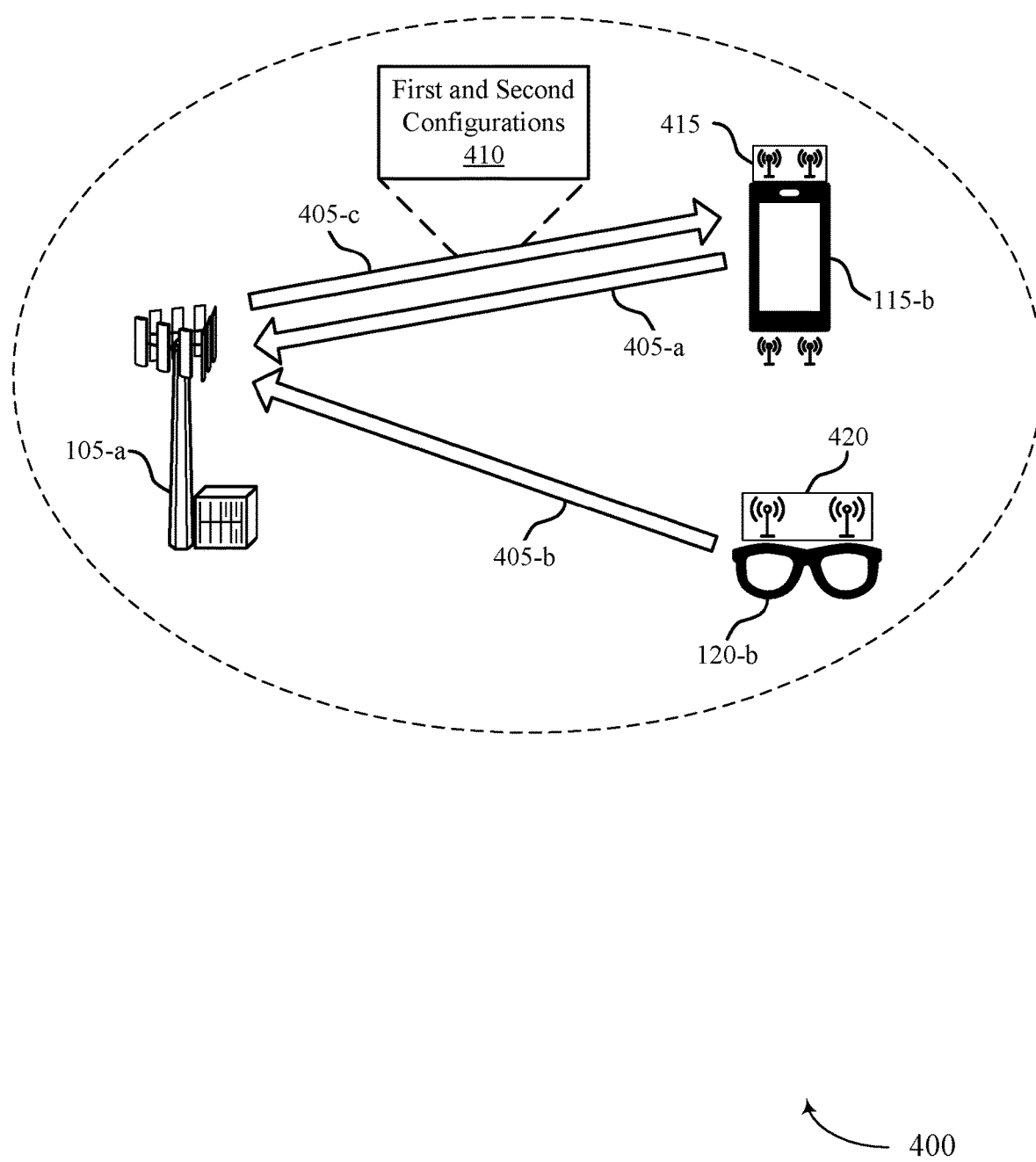
FIG. 4 illustrates an example of a wireless communications system that supports wireless device cooperative transmission schemes in accordance with aspects of the present disclosure.

FIG. 4 illustrates an example of a wireless communications system 400 that supports wireless device cooperative transmission schemes in accordance with aspects of the present disclosure. Wireless communications system 400 includes base station 105-a, which may be an example of a base station 105 described with reference to FIGS. 1 through 3. Wireless communications system 400 also includes UE 115-b and wireless device 120-b, which may be examples of a UE 115 and a wireless device 120, respectively, described with reference to FIGS. 1 through 3. UE 115-b may also be an example of a first device described with reference to FIG. 3, and wireless device 120-b may be an example of a second device described with reference to FIG. 3. Base station 105-a may communicate with UE 115-b on resources of a carrier 405-a and a carrier 405-c, and base station 105-a may communicate with wireless device 120-b on resources of a carrier 405-b.

Wireless communications system 400 may implement aspects of wireless communications system 100. For example, UE 115-b and wireless device 120-b in wireless communications system 400 may support efficient techniques for transmitting uplink signals to base station 105-a using shared antennas. In particular, UE 115-b may use different configurations for generating uplink signals for transmission on local antennas 415 at the UE 115-b and for generating uplink signals for transmission on auxiliary antennas 420 at the wireless device 120-b. That is, the UE 115-b may transmit on separate layers or may transmit separate transport blocks on the local antennas 415 and the auxiliary antennas 420. The different configurations may be based on the different capabilities of the local antennas 415 and the auxiliary antennas 420. In some cases, UE 115-b may transmit a capability indication to base station 105-a indicating that UE 115-*b* is capable of using local antennas 415 and auxiliary antennas 420 for transmitting uplink signals to base station 105-*b*.

In the example of FIG. 4, UE 115-*b* may receive a control message (e.g., downlink control information (DCI) message on carrier 405-*c*) indicating first and second configurations 410 for generating uplink signals for transmission using local antennas 415 and auxiliary antennas 420. In some cases, the control message may be received in response to transmitting the capability indication to base station 105-*b* indicating that UE 115-*b* is capable of using local antennas 415 and auxiliary antennas 420. UE 115-*b* may generate first uplink signals for transmission to base station 105-*a* on carrier 405-*a* using local antennas 415 based on the first configuration, and UE 115-*b* may generate samples (e.g., IQ samples) of second uplink signals to be sent to wireless device 120-*b* for transmission to base station 105-*a* on carrier 405-*b* using auxiliary antennas 420.

The different configurations 410 may include different modulation and coding scheme (MCS) configurations (e.g., modulation orders and code rates), different precoder configurations, different transmit power configurations, etc. for transmissions on the local and auxiliary antennas. If first and second modulation orders are configured for transmissions on the local and auxiliary antennas, respectively, UE 115-*b* may modulate the first uplink signals for transmission using local antennas 415 based on the first modulation order (e.g., 16 quadrature amplitude modulation (QAM)), and UE 115-*b* may modulate the second uplink signals for transmission using auxiliary antennas 420 based on the second modulation order (e.g., quadrature phase-shift keying (QPSK)). If first and second code rates are configured for transmissions on the local and auxiliary antennas, respectively, UE 115-*b* may encode the first uplink signals for transmission using local antennas 415 based on the first code rate (e.g., 0.25), and UE 115-*b* may encode the second uplink signals for transmission using auxiliary antennas 420 based on the second code rate (e.g., 0.5).

Further, if first and second precoders are configured for transmissions on the local and auxiliary antennas, respectively, UE 115-*b* may precode the first uplink signals for transmission using local antennas 415 using the first precoder, and UE 115-*b* may precode the second uplink signals for transmission using auxiliary antennas 420 using the second precoder. As an example, for a three-layer transmission from UE 115-*b* with four local antennas, the first precoder may be a 4×3 precoder, and, for a single-layer transmission from wireless device 120-*b*, the second precoder may be a 2×1 precoder. In some cases, base station 105-*a* may use different fields to indicate the first and second precoders (or codebooks). In some other cases, to reduce signaling overhead, base station 105-*a* may use a single field to indicate the first and second precoders (or codebooks). In some such cases, the single field may indicate a joint precoder (e.g., of a range of configured joint precoders) that includes the first and second precoders. The joint precoder may have a block diagonal structure for the UE 115-*b* and the wireless device 120-*b* (e.g., as described in Equation 1).

$$P_{Joint} = \begin{bmatrix} [P_{HMD}]_{2\times 1} & [0]_{2\times 3} \\ [0]_{4\times 1} & [P_{phone}]_{4\times 3} \end{bmatrix}_{6\times 4} \quad (1)$$

Once UE 115-*b* generates the first uplink signals and the samples of the second uplink signals, UE 115-*b* may transmit the first uplink signals using the local antennas 415 to base station 105-*a*, and UE 115-*b* may send the samples of the second uplink signals to wireless device 120-*b* for transmission using the auxiliary antennas 420. Wireless device 120-*b* may receive the samples of the second uplink signals from UE 115-*b* and may upconvert, amplify, and transmit the second uplink signals to base station 105-*a* using the auxiliary antennas 420. In some cases, if the first and second configurations 410 indicate first and second transmit powers for transmissions on the local and auxiliary antennas, respectively, the UE 115-*b* may transmit the first uplink signals using the first transmit power, and UE 115-*b* may transmit a control message indicating the second transmit power to wireless device 120-*b*. Wireless device 120-*b* may receive the control message, identify the second transmit power from the control message, and transmit the second uplink signals using the indicated second transmit power.

In some cases, rather than transmitting data to base station 105-*a*, UE 115-*b* may be scheduled to transmit sounding reference signals (SRSs) using local antennas 415 and auxiliary antennas 420 (e.g., using six SRS sounding ports in total, with four ports at UE 115-*b* (P2, P3, P4, and P5) and two ports at wireless device 120-*b* (P0 and P1)). In some such cases, the different configurations 410 may include different SRS bandwidths, SRS comb sizes, SRS sequences, SRS ports, etc. for transmissions on the local and auxiliary antennas. In some other cases, the configurations for transmissions on the local and auxiliary antennas may be the same. Further, the SRS resources (e.g., resource sets) allocated for UE 115-*b* to transmit the SRSs using the local antennas 415 and for wireless device 120-*b* to transmit the SRSs using the auxiliary antennas 420 may be the same or may be different (e.g., the SRS transmission may be configured on the same or different orthogonal frequency division multiplexing (OFDM) symbols). If different SRS resources are allocated for UE 115-*b* and wireless device 120-*b*, SRS quality may be improved at the expense of SRS overhead. For instance, with separate sounding for UE 115-*b* and wireless device 120-*b*, base station 105-*a* may be able to identify when hand-block occurs (e.g., the blocking of signals), and the base station 105-*a* may issue precoders and power control commands accordingly. Alternatively, if the same SRS resources are allocated for UE 115-*b* and wireless device 120-*b*, SRS overhead may be improved at the expense of SRS quality.

Figure 5:
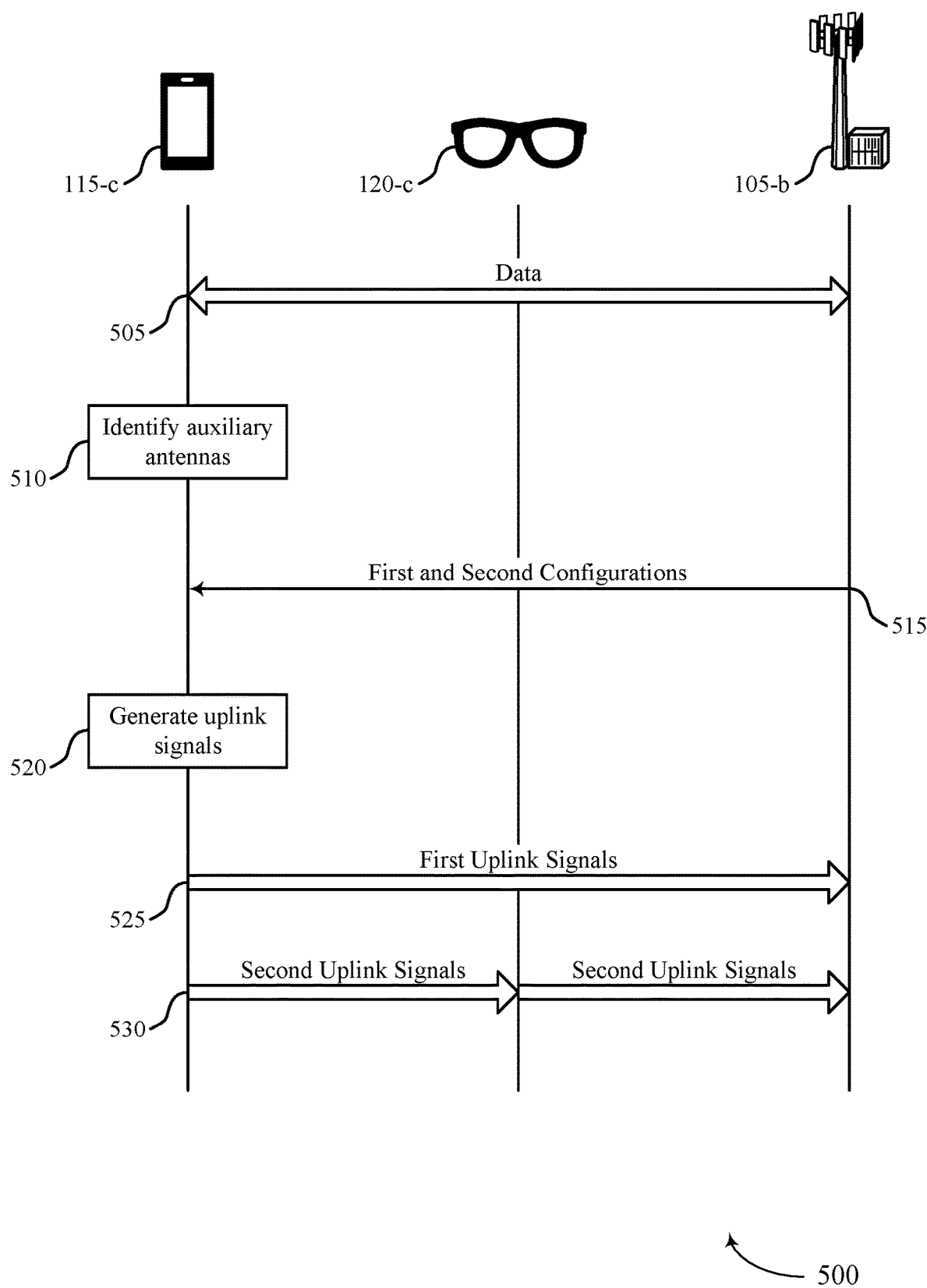
FIG. 5 illustrates an example of a process flow that supports wireless device cooperative transmission schemes in accordance with aspects of the present disclosure.

FIG. 5 illustrates an example of a process flow 500 that supports wireless device cooperative transmission schemes in accordance with aspects of the present disclosure. Process flow 500 illustrates aspects of techniques performed by a UE 115-*c*, which may be an example of a UE 115 described with reference to FIGS. 1 and 2, a UE 115-*a* described with reference to FIG. 3, and a UE 115-*b* described with reference to FIG. 4. Process flow 500 illustrates aspects of techniques performed by a wireless device 120-*c*, which may be an example of an XR device, such as a wireless device 120 described with reference to FIGS. 1 and 2, a wireless device 120-*a* described with reference to FIG. 3, and a wireless device 120-*b* described with reference to FIG. 4. Process flow 500 illustrates aspects of techniques performed by a base station 105-*b*, which may be an example of a base station 105 described with reference to FIGS. 1 through 3 and a base station 105-*a* described with reference to FIG. 4. As described herein, UE 115-*c* may be referred to as a first device, and wireless device 120-*c* may be referred to as a second device. Alternatively, wireless device 120-*c* may be a first device and UE 115-*c* may be a second device.

At 505, UE 115-*c* may communicate (e.g., exchange data) with base station 105-*b* over a first communication link using a set of local antennas. At 510, UE 115-c may identify wireless device 120-c that has a set of auxiliary antennas for transmitting uplink signals to the base station 105-b. In some cases, UE 115-c may transmit, to base station 105-b, an indication (e.g., capability indication) that the UE 115-c is capable of transmitting uplink signals using the set of local antennas and the set of auxiliary antennas. UE 115-c may be in communication with wireless device 120-c over a second communication link. The second communication link may be a USB link, a Bluetooth link, a Wi-Fi link, or a sidelink. At 515, UE 115-c may receive, from base station 105-b, a control message (e.g., DCI message) indicating a first configuration for generating first uplink signals for transmission to the base station 105-b by UE 115-c and a second configuration for generating second uplink signals for transmission to the base station 105-b by wireless device 120-c.

At 520, UE 115-c may generate the first uplink signals and the second uplink signals. In one example, the first configuration includes a first modulation order, the second configuration includes a second modulation order, and UE 115-c may modulate the first uplink signals based on the first modulation order and modulate the second uplink signals based on the second modulation order. In another example, the first configuration includes a first code rate, the second configuration includes a second code rate, and UE 115-c may encode the first uplink signals based on the first code rate and encode the second uplink signals based on the second code rate. In yet another example, the first configuration includes a first precoder, the second configuration includes a second precoder, and UE 115-c may precode the first uplink signals using the first precoder and precode the second uplink signals using the second precoder.

In some cases, UE 115-c may receive, in the control message, a single field indicating a joint precoder of a set of multiple joint precoders, the joint precoder including the first precoder for the first device and the second precoder for the second device. In other cases, UE 115-c may receive, in the control message, a first field indicating the first precoder for the first device and a second field indicating the second precoder for the second device. At 525, UE 115-c may transmit, over the first communication link, the first uplink signals to the base station 105-b using at least one antenna of the set of local antennas. At 530, UE 115-c may transmit, over the second communication link, the second uplink signals to wireless device 120-c, and wireless device 120-c may transmit the second uplink signals to base station 105-b over the first communication link using at least one antenna of the set of auxiliary antennas.

In some aspects, rather than using different configurations or different layers (e.g., different transport blocks) for uplink transmissions on local antennas and auxiliary antennas, a first device may coordinate (e.g., communicate or exchange signals) with a second device to generate uplink signals for a joint transmission to a base station using local antennas of the first device and auxiliary antennas of the second device. That is, the local antennas of the first device and the auxiliary antennas of the second device may be virtually combined. With virtual combining (e.g., via cyclic delay diversity (CDD)), the use of antennas at different devices may be transparent to the network (e.g. a base station), and conventional precoding procedures may be reused.

In some cases, the first device may identify a precoding scheme for precoding uplink signals for joint transmission to a base station on local antennas of the first device and auxiliary antennas of the second device, and the first device may precode the uplink signals based on the precoding scheme. The precoding scheme may allow for the phase coherence between the local antennas and the auxiliary antennas to remain within a threshold (e.g., even though the local and auxiliary antennas are driven by different oscillators and RF components). Further, the first device may identify a transmit power split for a joint transmission to a base station on local antennas of the first device and auxiliary antennas of the second device, and the first device may transmit the uplink signals to the base station using the local and auxiliary antennas based on the transmit power split. Thus, the transmit power from the physical antennas virtualized into a single virtual transmit antenna may be different (e.g., from the respective transmit powers of the local and auxiliary antennas), and the power may be split between the first and second devices and may be transparent to the network. In some such cases, the first device may autonomously adjust antenna combing and power splitting between the first device and the second device to combat handblocking.

Figure 6:
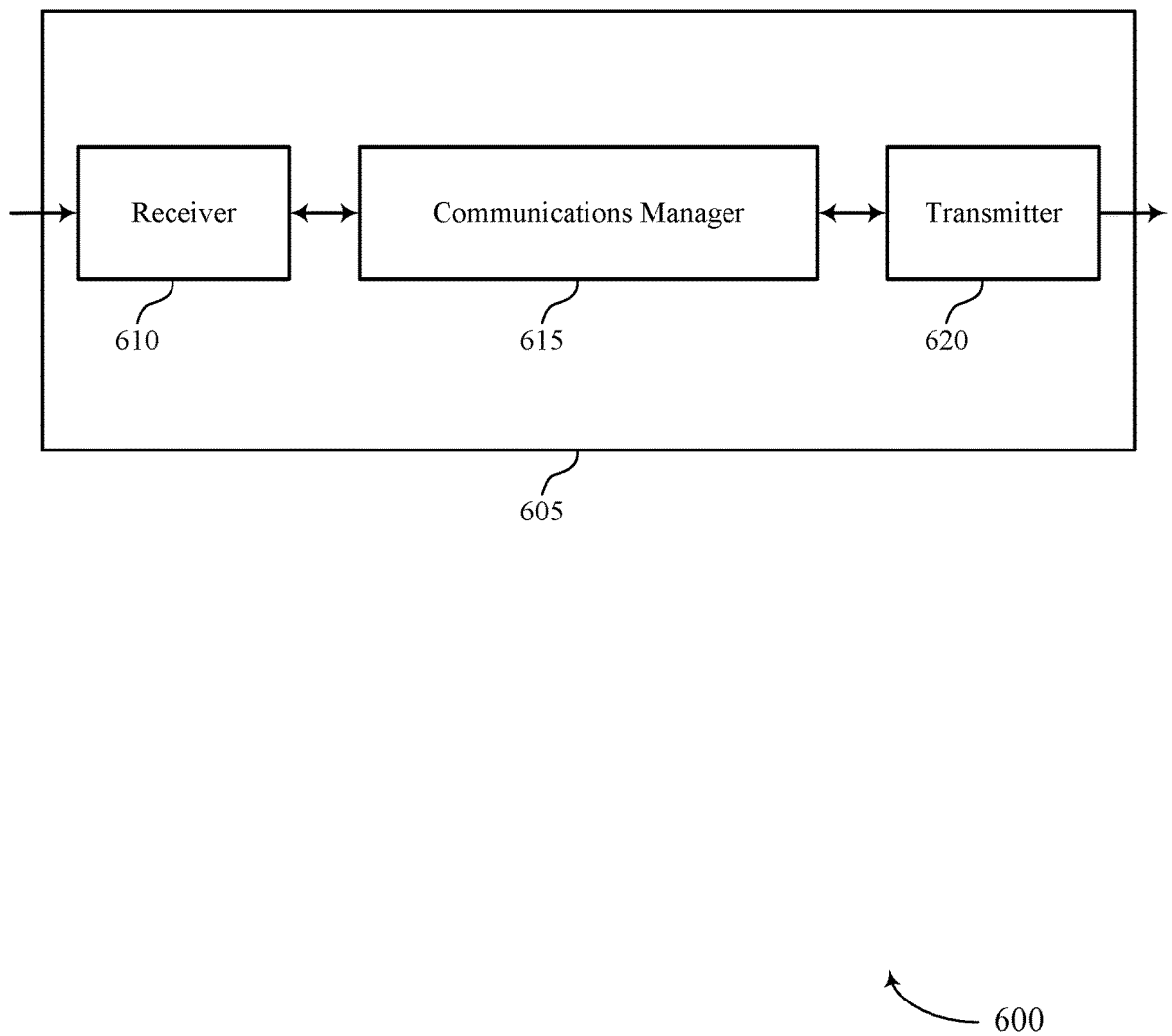
FIGS. 6 and 7 show block diagrams of devices that support wireless device cooperative transmission schemes in accordance with aspects of the present disclosure.

FIG. 6 shows a block diagram 600 of a device 605 that supports wireless device cooperative transmission schemes in accordance with aspects of the present disclosure. The device 605 may be an example of aspects of a UE 115 as described herein. The device 605 may include a receiver 610, a communications manager 615, and a transmitter 620. The device 605 may also include a processor. Each of these components may be in communication with one another (e.g., via one or more buses).

The receiver 610 may receive information such as packets, user data, or control information associated with various information channels (e.g., control channels, data channels, and information related to wireless device cooperative transmission schemes, etc.). Information may be passed on to other components of the device 605. The receiver 610 may be an example of aspects of the transceiver 920 described with reference to FIG. 9. The receiver 610 may utilize a single antenna or a set of antennas.

The communications manager 615 may communicate with a base station over a first communication link using a set of local antennas. The communications manager 615 may identify a second device having a set of auxiliary antennas for transmitting uplink signals to the base station, where the first device is in communication with the second device over a second communication link. The communications manager 615 may receive, from the base station, a control message indicating a first configuration for generating first uplink signals for transmission to the base station by the first device and a second configuration for generating second uplink signals for transmission to the base station by the second device. The communications manager 615 may transmit, over the first communication link, the first uplink signals to the base station using the set of local antennas based on the first configuration, and the communications manager 615 may transmit, over the second communication link, samples of the second uplink signals to the second device for transmission of the second uplink signals to the base station over the first communication link using the set of auxiliary antennas based on the second configuration.

The communications manager 615 may also communicate with a base station over a first communication link using a set of local antennas. The communications manager 615 may identify a second device having a set of auxiliary antennas for transmitting uplink signals to the base station, where the first device is in communication with the second device over a second communication link. The communications manager 615 may coordinate with the second device to generate uplink signals for joint transmission to the base station using the set of local antennas of the first device and the set of auxiliary antennas of the second device. The communications manager 615 may transmit, over the first communication link, the uplink signals to the base station using the set of local antennas of the first device and the set of auxiliary antennas of the second device based on the coordinating. The communications manager 615 may be an example of aspects of the communications manager 910 described herein.

Particular aspects of the subject matter described herein may be implemented to realize one or more advantages. The described techniques may support improvements in wireless device cooperative transmission schemes, improving reliability and throughput, among other advantages. As such, supported techniques may include improved network operations and, in some examples, may promote network efficiencies, among other benefits.

The communications manager 615 as described herein may be implemented to realize one or more potential advantages. One implementation may allow the device 605 to utilize antennas on a wireless device for uplink transmissions to a base station (e.g., the wireless device may cooperate or share antennas with the device 605), thus improving throughput performance and reducing power consumption at the device 605. In some examples, a processor of the device 605 (e.g., a processor controlling the receiver 610, the communications manager 615, the transmitter 620, or some combination thereof) may reduce processing resources used for uplink transmissions based on implementing one or more of the wireless device cooperative transmission schemes as described herein. For example, by transmitting using different configurations for local antennas and auxiliary antennas (e.g., a first configuration selected based on one or more aspects of the local antennas and a second configuration selected based on one or more aspects of the auxiliary antennas), the device 605 may improve transmission reliability (e.g., uplink transmission reliability). Improving transmission reliability may potentially reduce the number of retransmissions performed in the system, allowing the device 605 to reduce the number of times the processor ramps up processing power and turns on processing units to handle retransmissions.

The communications manager 615, or its sub-components, may be implemented in hardware, code (e.g., software or firmware) executed by a processor, or any combination thereof. If implemented in code executed by a processor, the functions of the communications manager 615, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 615, or its sub-components, may be physically located at various positions, including being distributed such that portions of functions are implemented at different physical locations by one or more physical components. In some examples, the communications manager 615, or its sub-components, may be a separate and distinct component in accordance with various aspects of the present disclosure. In some examples, the communications manager 615, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 620 may transmit signals generated by other components of the device 605. In some examples, the transmitter 620 may be collocated with a receiver 610 in a transceiver module. For example, the transmitter 620 may be an example of aspects of the transceiver 920 described with reference to FIG. 9. The transmitter 620 may utilize a single antenna or a set of antennas.

Figure 7:
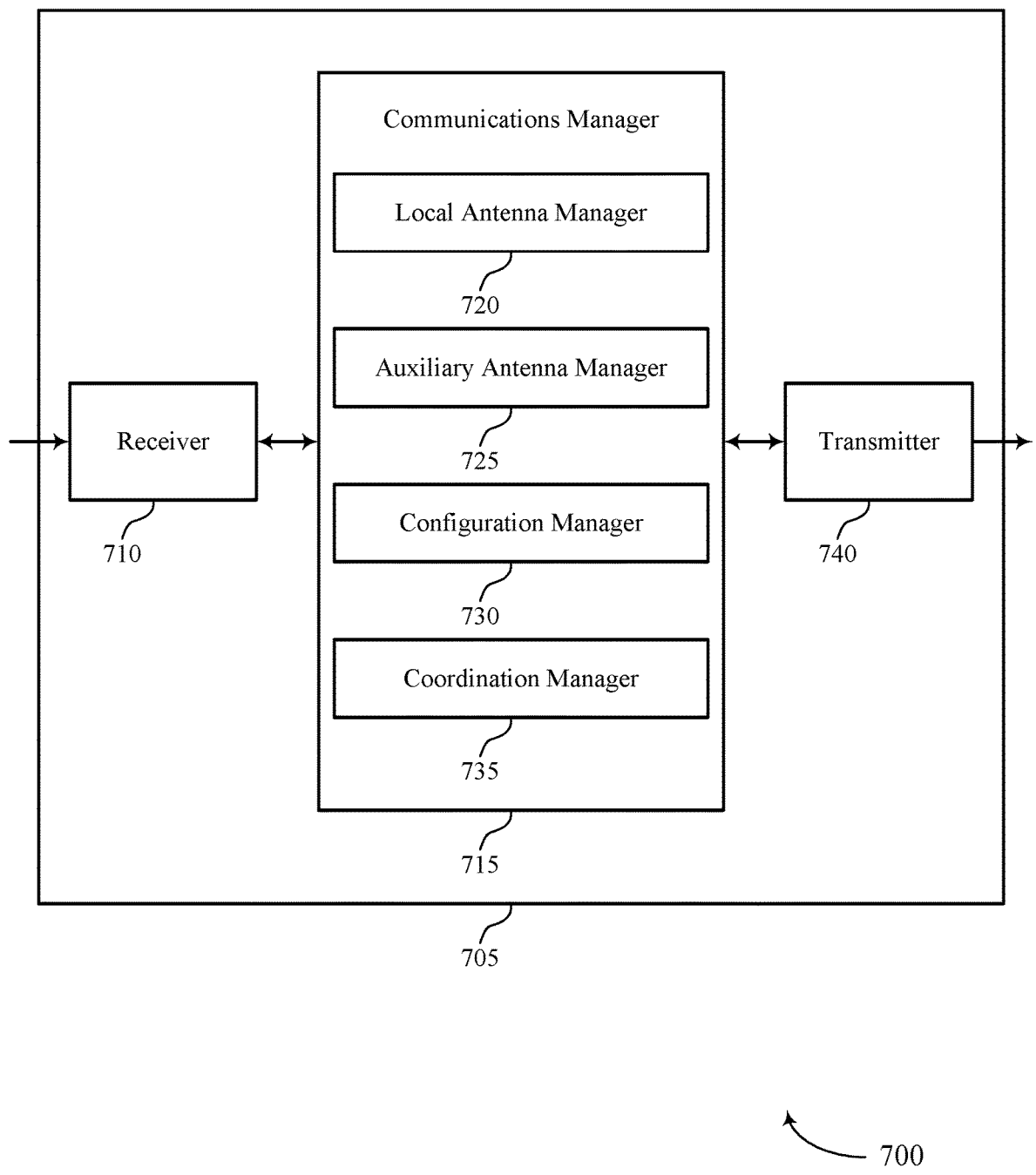

FIG. 7 shows a block diagram 700 of a device 705 that supports wireless device cooperative transmission schemes in accordance with aspects of the present disclosure. The device 705 may be an example of aspects of a device 605, or a UE 115 as described herein. The device 705 may include a receiver 710, a communications manager 715, and a transmitter 740. The device 705 may also include a processor. Each of these components may be in communication with one another (e.g., via one or more buses).

The receiver 710 may receive information such as packets, user data, or control information associated with various information channels (e.g., control channels, data channels, and information related to wireless device cooperative transmission schemes, etc.). Information may be passed on to other components of the device 705. The receiver 710 may be an example of aspects of the transceiver 920 described with reference to FIG. 9. The receiver 710 may utilize a single antenna or a set of antennas.

The communications manager 715 may be an example of aspects of the communications manager 615 as described herein. The communications manager 715 may include a local antenna manager 720, an auxiliary antenna manager 725, a configuration manager 730, and a coordination manager 735. The communications manager 715 may be an example of aspects of the communications manager 910 described herein.

The local antenna manager 720 may communicate with a base station over a first communication link using a set of local antennas. The auxiliary antenna manager 725 may identify a second device having a set of auxiliary antennas for transmitting uplink signals to the base station, where the first device is in communication with the second device over a second communication link. The configuration manager 730 may receive, from the base station, a control message indicating a first configuration for generating first uplink signals for transmission to the base station by the first device and a second configuration for generating second uplink signals for transmission to the base station by the second device. The local antenna manager 720 may transmit, over the first communication link, the first uplink signals to the base station using the set of local antennas based on the first configuration. The auxiliary antenna manager 725 may transmit, over the second communication link, samples of the second uplink signals to the second device for transmission of the second uplink signals to the base station over the first communication link using the set of auxiliary antennas based on the second configuration.

The local antenna manager 720 may communicate with a base station over a first communication link using a set of local antennas. The auxiliary antenna manager 725 may identify a second device having a set of auxiliary antennas for transmitting uplink signals to the base station, where the first device is in communication with the second device over a second communication link. The coordination manager 735 may coordinate with the second device to generate uplink signals for joint transmission to the base station using the set of local antennas of the first device and the set of auxiliary antennas of the second device and transmit, over the first communication link, the uplink signals to the base station using the set of local antennas of the first device and the set of auxiliary antennas of the second device based on the coordinating.

The transmitter 740 may transmit signals generated by other components of the device 705. In some examples, the transmitter 740 may be collocated with a receiver 710 in a transceiver module. For example, the transmitter 740 may be an example of aspects of the transceiver 920 described with reference to FIG. 9. The transmitter 740 may utilize a single antenna or a set of antennas.

Figure 8:
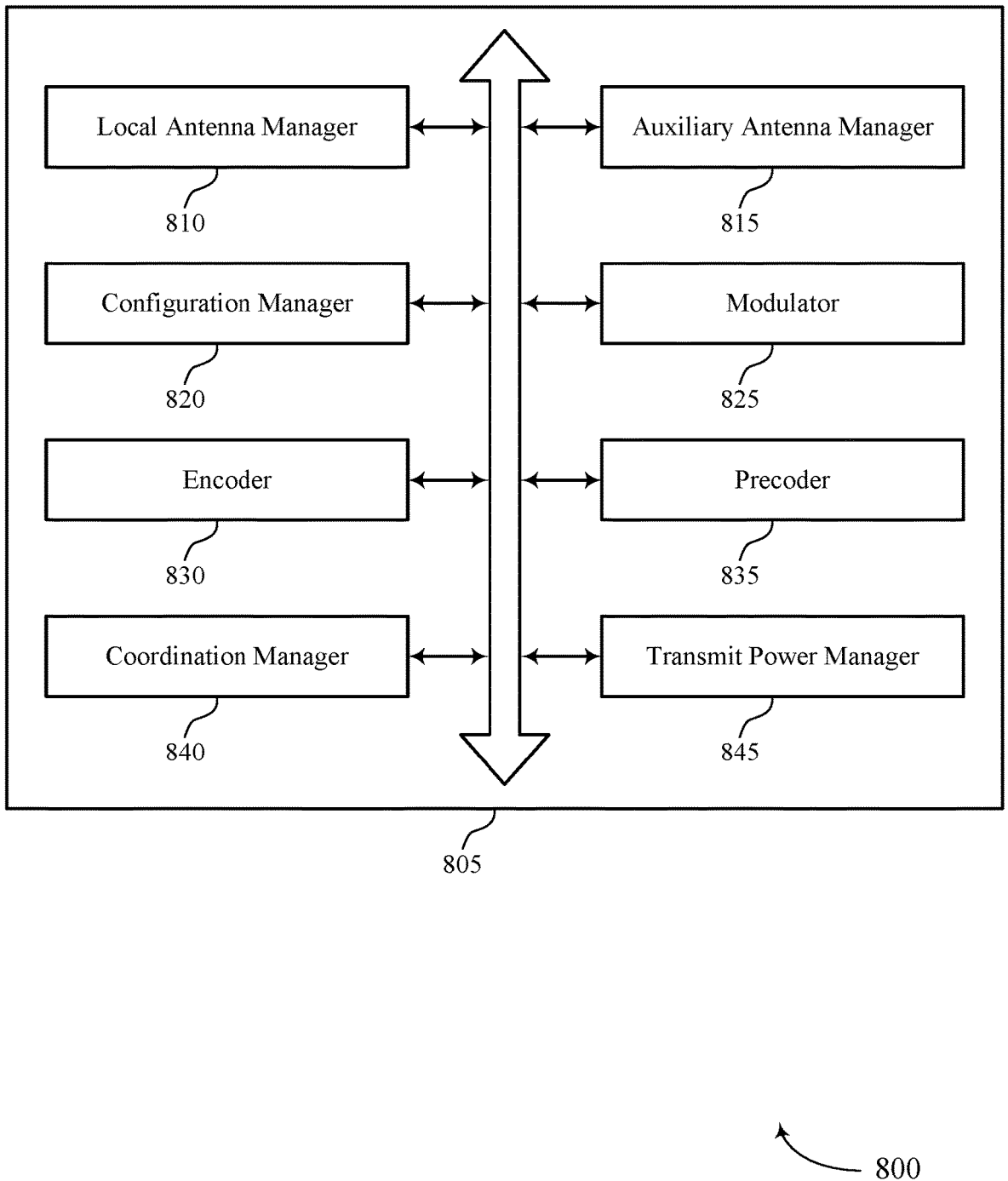
FIG. 8 shows a block diagram of a communications manager that supports wireless device cooperative transmission schemes in accordance with aspects of the present disclosure.

FIG. 8 shows a block diagram 800 of a communications manager 805 that supports wireless device cooperative transmission schemes in accordance with aspects of the present disclosure. The communications manager 805 may be an example of aspects of a communications manager 615, a communications manager 715, or a communications manager 910 described herein. The communications manager 805 may include a local antenna manager 810, an auxiliary antenna manager 815, a configuration manager 820, a modulator 825, an encoder 830, a precoder 835, a coordination manager 840, and a transmit power manager 845. Each of these components may communicate, directly or indirectly, with one another (e.g., via one or more buses).

The local antenna manager 810 may communicate with a base station over a first communication link using a set of local antennas. The auxiliary antenna manager 815 may identify a second device having a set of auxiliary antennas for transmitting uplink signals to the base station, where the first device is in communication with the second device over a second communication link. The configuration manager 820 may receive, from the base station, a control message indicating a first configuration for generating first uplink signals for transmission to the base station by the first device and a second configuration for generating second uplink signals for transmission to the base station by the second device. In some examples, the local antenna manager 810 may transmit, over the first communication link, the first uplink signals to the base station using the set of local antennas based on the first configuration. In some examples, the auxiliary antenna manager 815 may transmit, over the second communication link, samples of the second uplink signals to the second device for transmission of the second uplink signals to the base station over the first communication link using the set of auxiliary antennas based on the second configuration.

In some cases, the first configuration includes a first modulation order, and the second configuration includes a second modulation order. The modulator 825 may modulate the first uplink signals for transmission to the base station by the first device based on the first modulation order. In some examples, the modulator 825 may modulate the second uplink signals for transmission to the base station by the second device based on the second modulation order. In some cases, the first configuration includes a first code rate, and the second configuration includes a second code rate. The encoder 830 may encode the first uplink signals for transmission to the base station by the first device based on the first code rate. In some examples, the encoder 830 may encode the second uplink signals for transmission to the base station by the second device based on the second code rate.

In some cases, the first configuration includes a first precoder, and the second configuration includes a second precoder. The precoder 835 may precode the first uplink signals for transmission to the base station by the first device using the first precoder. In some examples, the precoder 835 may precode the second uplink signals for transmission to the base station by the second device using the second precoder. In some examples, the configuration manager 820 may receive, in the control message, a single field indicating a joint precoder of a set of joint precoders, the joint precoder including the first precoder for the first device and the second precoder for the second device. In some examples, the configuration manager 820 may receive, in the control message, a first field indicating the first precoder for the first device and a second field indicating the second precoder for the second device.

In some cases, the first uplink signals include first sounding reference signals, and the second uplink signals include second sounding reference signals. In some cases, the first configuration includes a first sounding reference signal bandwidth, a first sounding reference signal comb size, a first sounding reference signal sequence, a first number of sounding reference signal ports, or any combination thereof. In some cases, the second configuration includes a second sounding reference signal bandwidth, a second sounding reference signal comb size, a second sounding reference signal sequence, a second number of sounding reference signal ports, or any combination thereof. In some cases, the first sounding reference signals and the second sounding reference signals are transmitted on different sounding reference signal resources.

In some cases, the second communication link includes USB link, a Bluetooth link, a Wi-Fi link, or a fifth generation (5G) sidelink. In some cases, the first device is a UE, a head mounted display, an XR device, an AR device, a VR device, or a wearable device. In some cases, the second device is a UE, a head mounted display, an XR device, an AR device, a VR device, or a wearable device. In some cases, the first device includes a 5G modem, and the second device includes an antenna and RF front-end. In some cases, the samples of the second uplink signals include in-phase and quadrature samples of the second uplink signals.

In some examples, the local antenna manager 810 may communicate with a base station over a first communication link using a set of local antennas. In some examples, the auxiliary antenna manager 815 may identify a second device having a set of auxiliary antennas for transmitting uplink signals to the base station, where the first device is in communication with the second device over a second communication link. The coordination manager 840 may coordinate with the second device to generate uplink signals for joint transmission to the base station using the set of local antennas of the first device and the set of auxiliary antennas of the second device. In some examples, the communications manager 805 may transmit, over the first communication link, the uplink signals to the base station using the set of local antennas of the first device and the set of auxiliary antennas of the second device based on the coordinating.

In some examples, the precoder 835 may identify a precoding scheme for precoding the uplink signals for joint transmission to the base station. In some examples, the precoder 835 may precode the uplink signals for joint transmission to the base station based on the precoding scheme, where a phase coherence between the set of local antennas and the set of auxiliary antennas is within a threshold. The transmit power manager 845 may identify a transmit power split for the joint transmission to the base station, where the transmit power split is between a first transmit power for transmitting on the set of local antennas and a second transmit power for transmitting on the set of auxiliary antennas. In some examples, the communications manager 805 may transmit the uplink signals to the base station using the set of local antennas and the set of auxiliary antennas based on the transmit power split.

Figure 9:
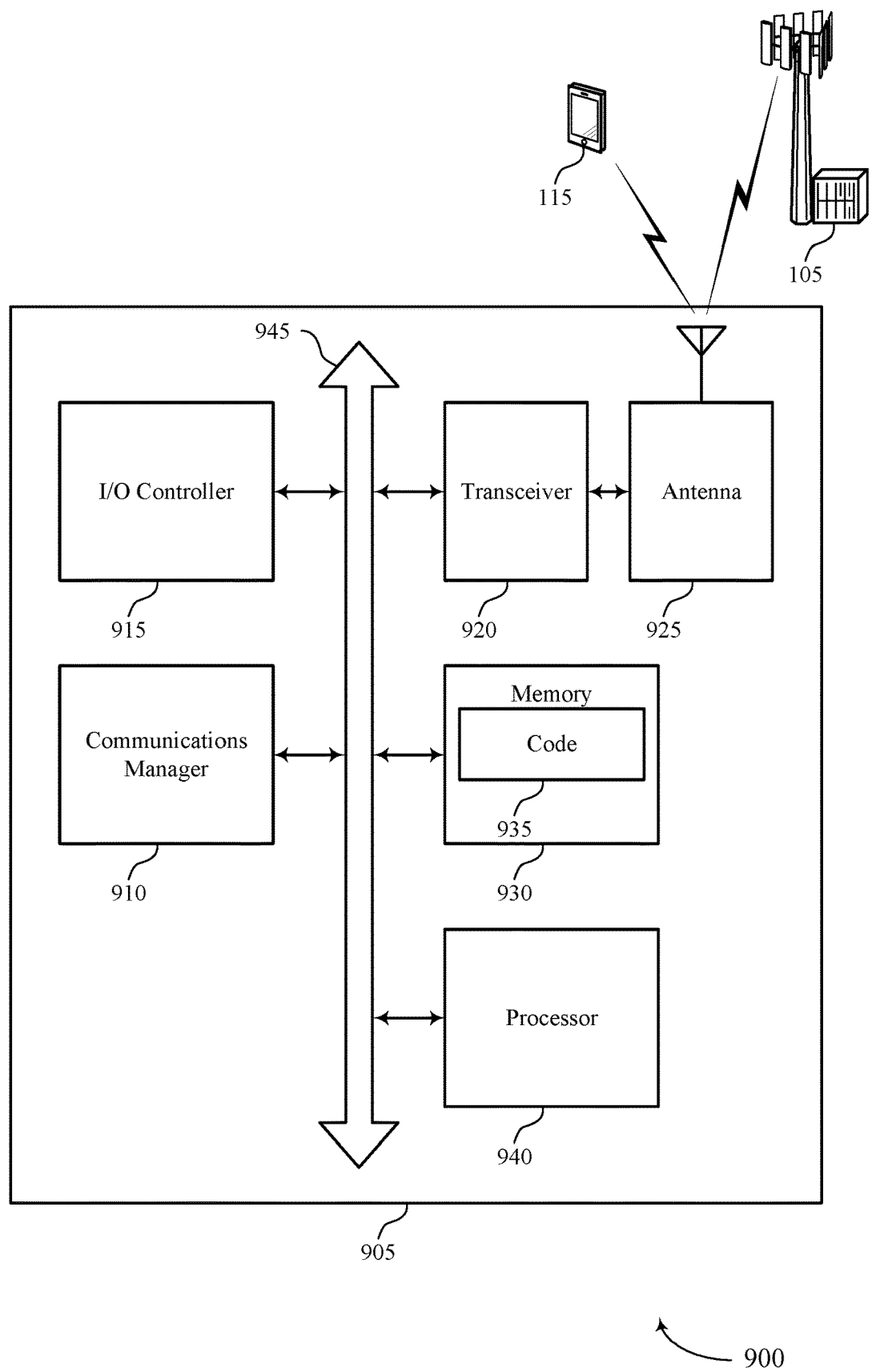
FIG. 9 shows a diagram of a system including a device that supports wireless device cooperative transmission schemes in accordance with aspects of the present disclosure.

FIG. 9 shows a diagram of a system 900 including a device 905 that supports wireless device cooperative transmission schemes in accordance with aspects of the present disclosure. The device 905 may be an example of or include the components of device 605, device 705, or a UE 115 as described herein. The device 905 may include components for bi-directional voice and data communications including components for transmitting and receiving communications, including a communications manager 910, an I/O controller 915, a transceiver 920, an antenna 925, memory 930, and a processor 940. These components may be in electronic communication via one or more buses (e.g., bus 945).

The communications manager 910 may communicate with a base station over a first communication link using a set of local antennas. The communications manager 910 may identify a second device having a set of auxiliary antennas for transmitting uplink signals to the base station, where the first device is in communication with the second device over a second communication link. The communications manager 910 may receive, from the base station, a control message indicating a first configuration for generating first uplink signals for transmission to the base station by the first device and a second configuration for generating second uplink signals for transmission to the base station by the second device. The communications manager 910 may transmit, over the first communication link, the first uplink signals to the base station using the set of local antennas based on the first configuration. The communications manager 910 may transmit, over the second communication link, samples of the second uplink signals to the second device for transmission of the second uplink signals to the base station over the first communication link using the set of auxiliary antennas based on the second configuration The communications manager 910 may also communicate with a base station over a first communication link using a set of local antennas, identify a second device having a set of auxiliary antennas for transmitting uplink signals to the base station, where the first device is in communication with the second device over a second communication link. The communications manager 910 may coordinate with the second device to generate uplink signals for joint transmission to the base station using the set of local antennas of the first device and the set of auxiliary antennas of the second device. The communications manager 910 may transmit, over the first communication link, the uplink signals to the base station using the set of local antennas of the first device and the set of auxiliary antennas of the second device based on the coordinating.

The I/O controller 915 may manage input and output signals for the device 905. The I/O controller 915 may also manage peripherals not integrated into the device 905. In some cases, the I/O controller 915 may represent a physical connection or port to an external peripheral. In some cases, the I/O controller 915 may utilize an operating system such as iOS®, ANDROID®, MS-DOS®, MS-WINDOWS®, OS/2®, UNIX®, LINUX®, or another known operating system. In other cases, the I/O controller 915 may represent or interact with a modem, a keyboard, a mouse, a touchscreen, or a similar device. In some cases, the I/O controller 915 may be implemented as part of a processor. In some cases, a user may interact with the device 905 via the I/O controller 915 or via hardware components controlled by the I/O controller 915.

The transceiver 920 may communicate bi-directionally, via one or more antennas, wired, or wireless links as described above. For example, the transceiver 920 may represent a wireless transceiver and may communicate bi-directionally with another wireless transceiver. The transceiver 920 may also include a modem to modulate the packets and provide the modulated packets to the antennas for transmission, and to demodulate packets received from the antennas.

In some cases, the wireless device may include a single antenna 925. However, in some cases the device may have more than one antenna 925, which may be capable of concurrently transmitting or receiving multiple wireless transmissions.

The memory 930 may include random-access memory (RAM) and read-only memory (ROM). The memory 930 may store computer-readable, computer-executable code 935 including instructions that, when executed, cause the processor to perform various functions described herein. In some cases, the memory 930 may contain, among other things, a basic I/O system (BIOS) which may control basic hardware or software operation such as the interaction with peripheral components or devices.

The processor 940 may include an intelligent hardware device (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 940 may be configured to operate a memory array using a memory controller. In other cases, a memory controller may be integrated into the processor 940. The processor 940 may be configured to execute computer-readable instructions stored in a memory (e.g., the memory 930) to cause the device 905 to perform various functions (e.g., functions or tasks supporting wireless device cooperative transmission schemes).

The code 935 may include instructions to implement aspects of the present disclosure, including instructions to support wireless communications. The code 935 may be stored in a non-transitory computer-readable medium such as system memory or other type of memory. In some cases, the code 935 may not be directly executable by the processor 940 but may cause a computer (e.g., when compiled and executed) to perform functions described herein.

Figure 10:
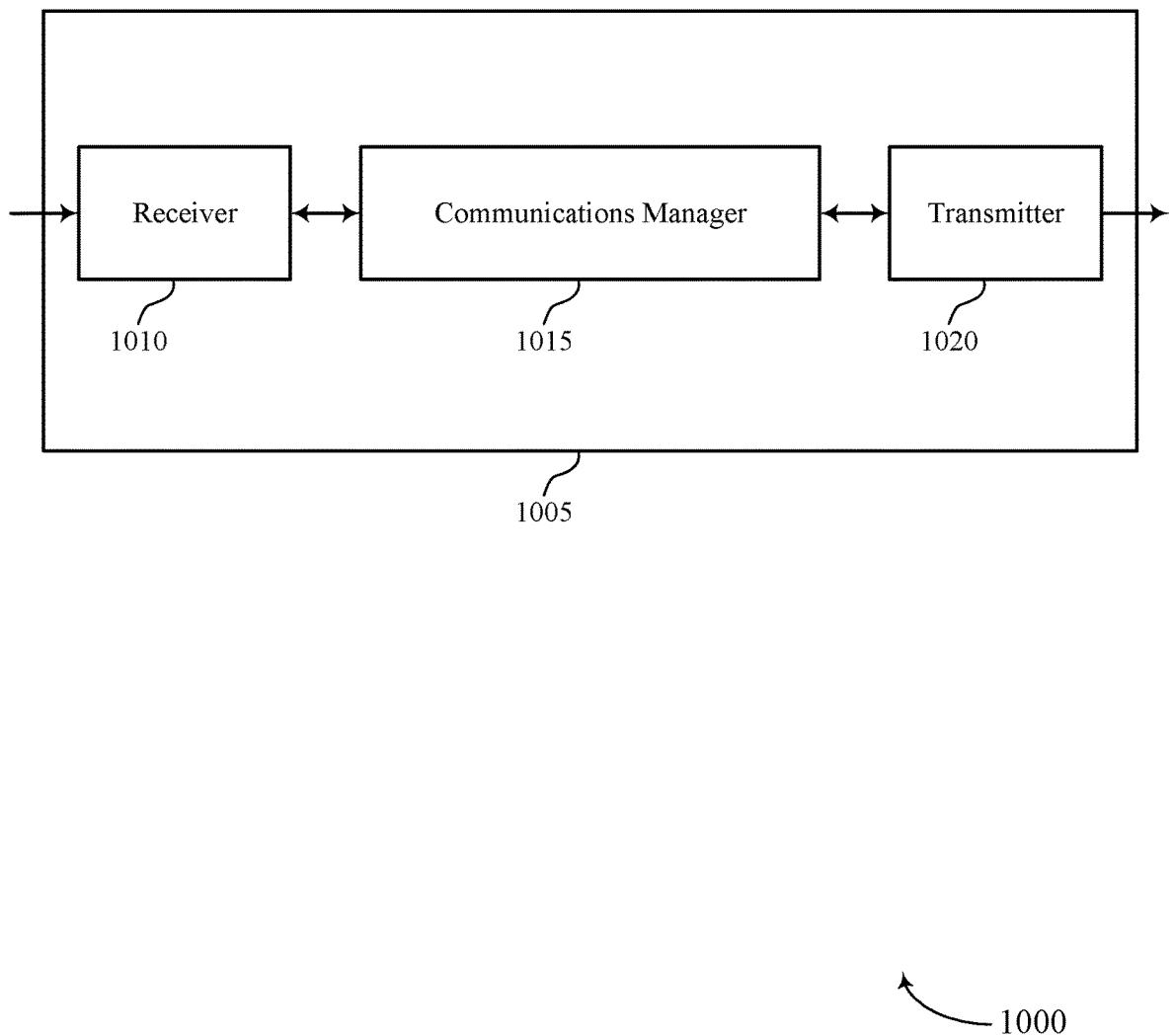
FIGS. 10 and 11 show block diagrams of devices that support wireless device cooperative transmission schemes in accordance with aspects of the present disclosure.

FIG. 10 shows a block diagram 1000 of a device 1005 that supports wireless device cooperative transmission schemes in accordance with aspects of the present disclosure. The device 1005 may be an example of aspects of a base station 105 as described herein. The device 1005 may include a receiver 1010, a communications manager 1015, and a transmitter 1020. The device 1005 may also include a processor. Each of these components may be in communication with one another (e.g., via one or more buses).

The receiver 1010 may receive information such as packets, user data, or control information associated with various information channels (e.g., control channels, data channels, and information related to wireless device cooperative transmission schemes, etc.). Information may be passed on to other components of the device 1005. The receiver 1010 may be an example of aspects of the transceiver 1320 described with reference to FIG. 13. The receiver 1010 may utilize a single antenna or a set of antennas.

The communications manager 1015 may receive, from a first device over a first communication link, an indication that a set of local antennas of the first device and a set of auxiliary antennas of a second device are to be used to transmit uplink signals to the base station, where the first device is in communication with the second device over a second communication link. The communications manager 1015 may transmit a control message to the first device indicating a first configuration for the first device to use to generate first uplink signals for transmission to the base station using the set of local antennas and a second configuration for the first device to use to generate second uplink signals for transmission to the base station using the set of auxiliary antennas. The communications manager 1015 may receive the first uplink signals from the first device and the second uplink signals from the second device based on transmitting the control message. The communications manager 1015 may be an example of aspects of the communications manager 1310 described herein.

The communications manager 1015, or its sub-components, may be implemented in hardware, code (e.g., software or firmware) executed by a processor, or any combination thereof. If implemented in code executed by a processor, the functions of the communications manager 1015, or its sub-components may be executed by a general-purpose processor, a DSP, an ASIC, an FPGA or other programmable logic device, discrete gate or transistor logic, discrete hardware components, or any combination thereof designed to perform the functions described in the present disclosure.

The communications manager 1015, or its sub-components, may be physically located at various positions, including being distributed such that portions of functions are implemented at different physical locations by one or more physical components. In some examples, the communications manager 1015, or its sub-components, may be a separate and distinct component in accordance with various aspects of the present disclosure. In some examples, the communications manager 1015, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1020 may transmit signals generated by other components of the device 1005. In some examples, the transmitter 1020 may be collocated with a receiver 1010 in a transceiver module. For example, the transmitter 1020 may be an example of aspects of the transceiver 1320 described with reference to FIG. 13. The transmitter 1020 may utilize a single antenna or a set of antennas.

Figure 11:
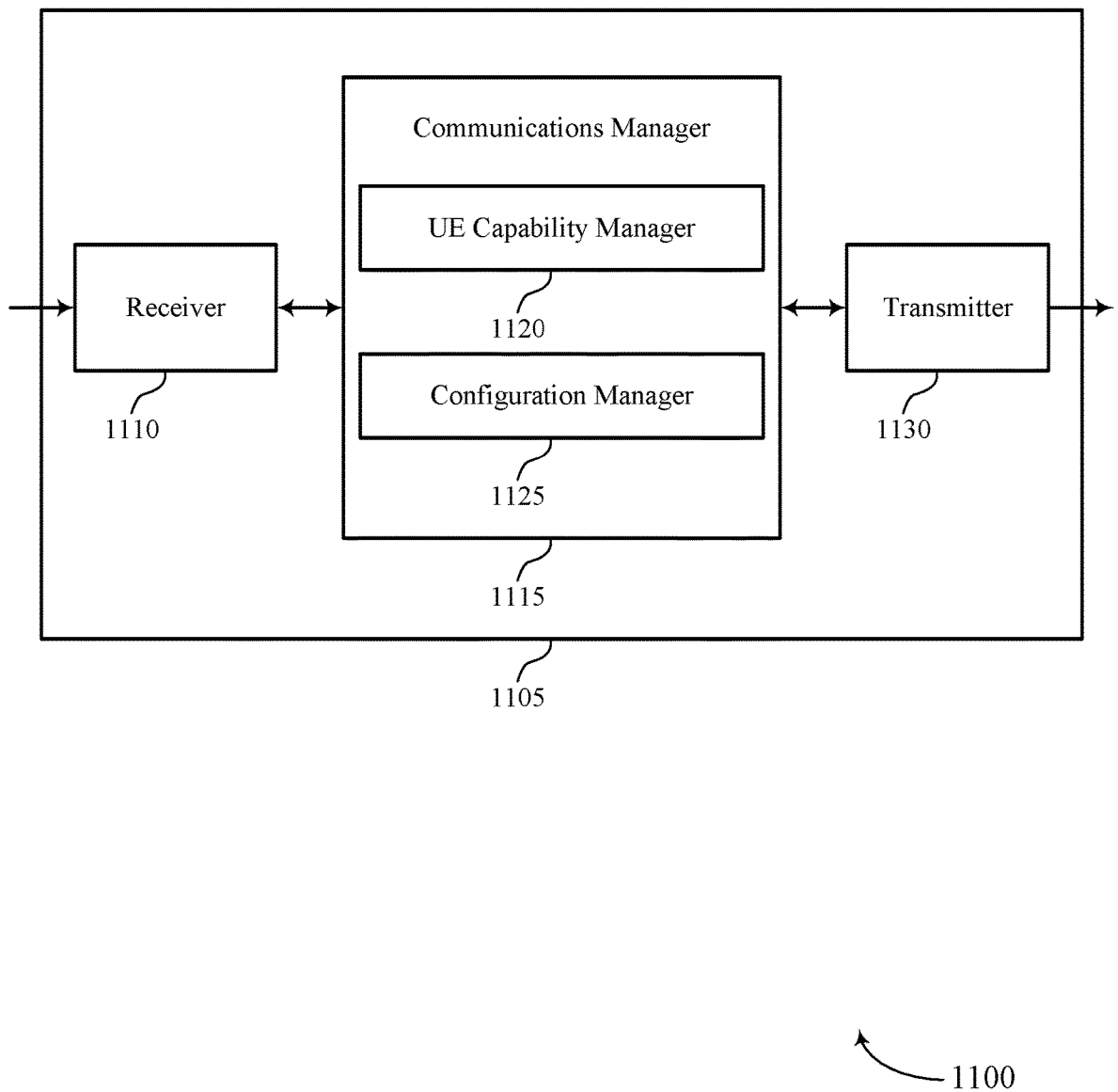

FIG. 11 shows a block diagram 1100 of a device 1105 that supports wireless device cooperative transmission schemes in accordance with aspects of the present disclosure. The device 1105 may be an example of aspects of a device 1005, or a base station 105 as described herein. The device 1105 may include a receiver 1110, a communications manager 1115, and a transmitter 1130. The device 1105 may also include a processor. Each of these components may be in communication with one another (e.g., via one or more buses).

The receiver 1110 may receive information such as packets, user data, or control information associated with various information channels (e.g., control channels, data channels, and information related to wireless device cooperative transmission schemes, etc.). Information may be passed on to other components of the device 1105. The receiver 1110 may be an example of aspects of the transceiver 1320 described with reference to FIG. 13. The receiver 1110 may utilize a single antenna or a set of antennas.

The communications manager 1115 may be an example of aspects of the communications manager 1015 as described herein. The communications manager 1115 may include a UE capability manager 1120 and a configuration manager 1125. The communications manager 1115 may be an example of aspects of the communications manager 1310 described herein.

The UE capability manager 1120 may receive, from a first device over a first communication link, an indication that a set of local antennas of the first device and a set of auxiliary antennas of a second device are to be used to transmit uplink signals to the base station, where the first device is in communication with the second device over a second communication link. The configuration manager 1125 may transmit a control message to the first device indicating a first configuration for the first device to use to generate first uplink signals for transmission to the base station using the set of local antennas and a second configuration for the first device to use to generate second uplink signals for transmission to the base station using the set of auxiliary antennas. The communications manager 1115 may receive the first uplink signals from the first device and the second uplink signals from the second device based on transmitting the control message.

The transmitter 1130 may transmit signals generated by other components of the device 1105. In some examples, the transmitter 1130 may be collocated with a receiver 1110 in a transceiver module. For example, the transmitter 1130 may be an example of aspects of the transceiver 1320 described with reference to FIG. 13. The transmitter 1130 may utilize a single antenna or a set of antennas.

Figure 12:
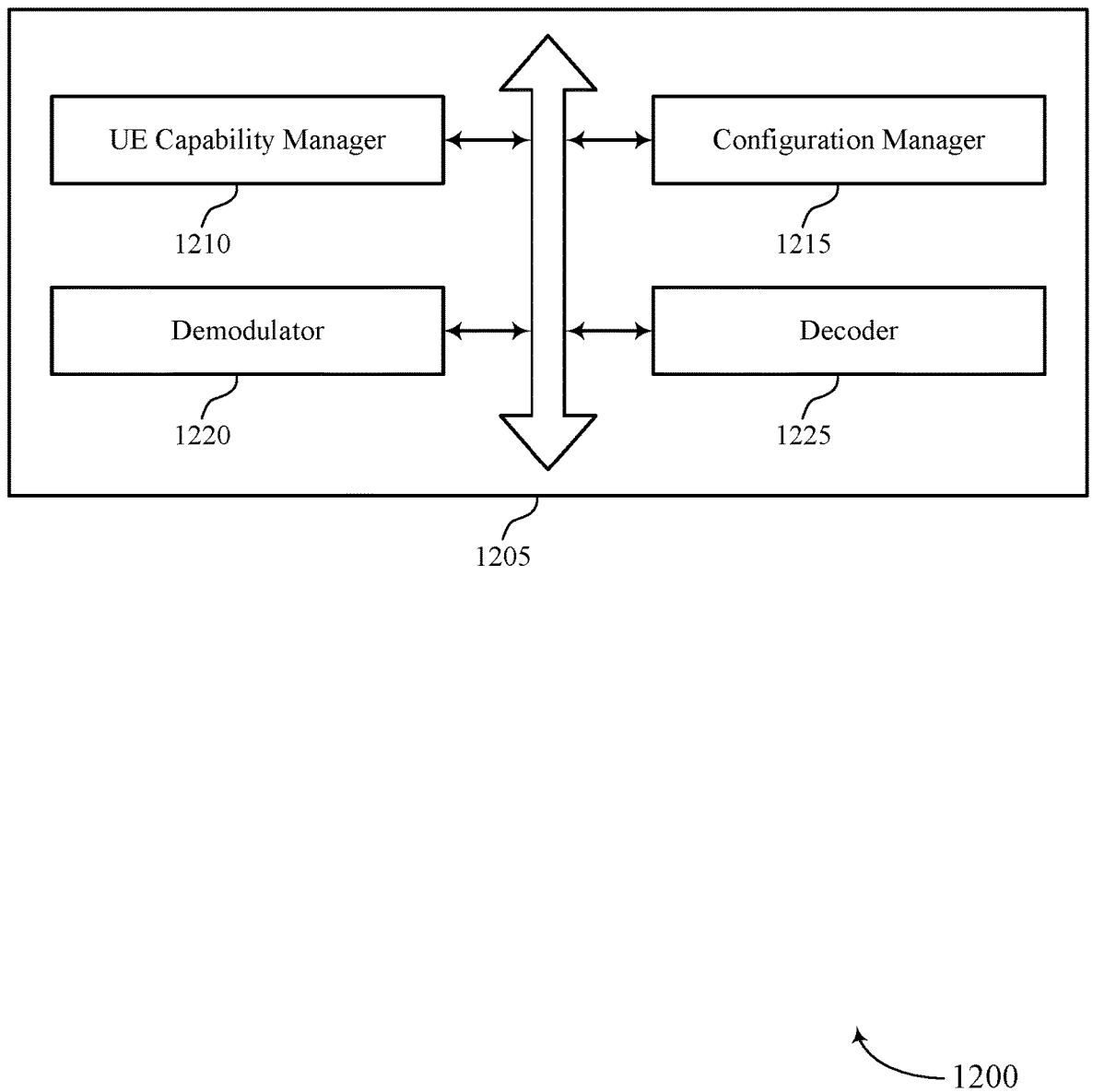
FIG. 12 shows a block diagram of a communications manager that supports wireless device cooperative transmission schemes in accordance with aspects of the present disclosure.

FIG. 12 shows a block diagram 1200 of a communications manager 1205 that supports wireless device cooperative transmission schemes in accordance with aspects of the present disclosure. The communications manager 1205 may be an example of aspects of a communications manager 1015, a communications manager 1115, or a communications manager 1310 described herein. The communications manager 1205 may include a UE capability manager 1210, a configuration manager 1215, a demodulator 1220, and a decoder 1225. Each of these modules may communicate, directly or indirectly, with one another (e.g., via one or more buses).

The UE capability manager 1210 may receive, from a first device over a first communication link, an indication that a set of local antennas of the first device and a set of auxiliary antennas of a second device are to be used to transmit uplink signals to the base station, where the first device is in communication with the second device over a second communication link. The configuration manager 1215 may transmit a control message to the first device indicating a first configuration for the first device to use to generate first uplink signals for transmission to the base station using the set of local antennas and a second configuration for the first device to use to generate second uplink signals for transmission to the base station using the set of auxiliary antennas. The communications manager 1205 may receive the first uplink signals from the first device and the second uplink signals from the second device based on transmitting the control message.

In some cases, the first configuration includes a first modulation order, and the second configuration includes a second modulation order. The demodulator 1220 may demodulate the first uplink signals received from the first device based on the first modulation order. In some examples, the demodulator 1220 may demodulate the second uplink signals received from the second device based on the second modulation order. In some cases, the first configuration includes a first code rate, and the second configuration includes a second code rate. The decoder 1225 may decode the first uplink signals received from the first device based on the first code rate. In some examples, the decoder 1225 may decode the second uplink signals received from the second device based on the second code rate.

In some cases, the first configuration includes a first precoder, and the second configuration includes a second precoder. In some examples, the decoder 1225 may decode the first uplink signals received from the first device based on the first uplink signals being precoded using the first precoder. In some examples, the decoder 1225 may decode the second uplink signals received from the second device based on the second uplink signals being precoded using the second precoder. In some examples, the configuration manager 1215 may transmit, in the control message, a single field indicating a joint precoder of a set of joint precoders, the joint precoder including the first precoder for the first device and the second precoder for the second device. In some examples, the configuration manager 1215 may transmit, in the control message, a first field indicating the first precoder for the first device and a second field indicating the second precoder for the second device.

In some cases, the first uplink signals include first sounding reference signals, and the second uplink signals include second sounding reference signals. In some cases, the first configuration includes a first sounding reference signal bandwidth, a first sounding reference signal comb size, a first sounding reference signal sequence, a first number of sounding reference signal ports, or a combination thereof. In some cases, the second configuration includes a second sounding reference signal bandwidth, a second sounding reference signal comb size, a second sounding reference signal sequence, a second number of sounding reference signal ports, or a combination thereof. In some cases, the first sounding reference signals and the second sounding reference signals are transmitted on different sounding reference signal resources.

In some cases, the second communication link includes USB link, a Bluetooth link, a Wi-Fi link, or a 5G sidelink. In some cases, the first device is a UE, a head mounted display, an XR device, an AR device, a VR device, or a wearable device. In some cases, the second device is a UE, a head mounted display, an XR device, an AR device, a VR device, or a wearable device. In some cases, the first device includes a 5G modem, and the second device includes an antenna and RF front-end.

Figure 13:
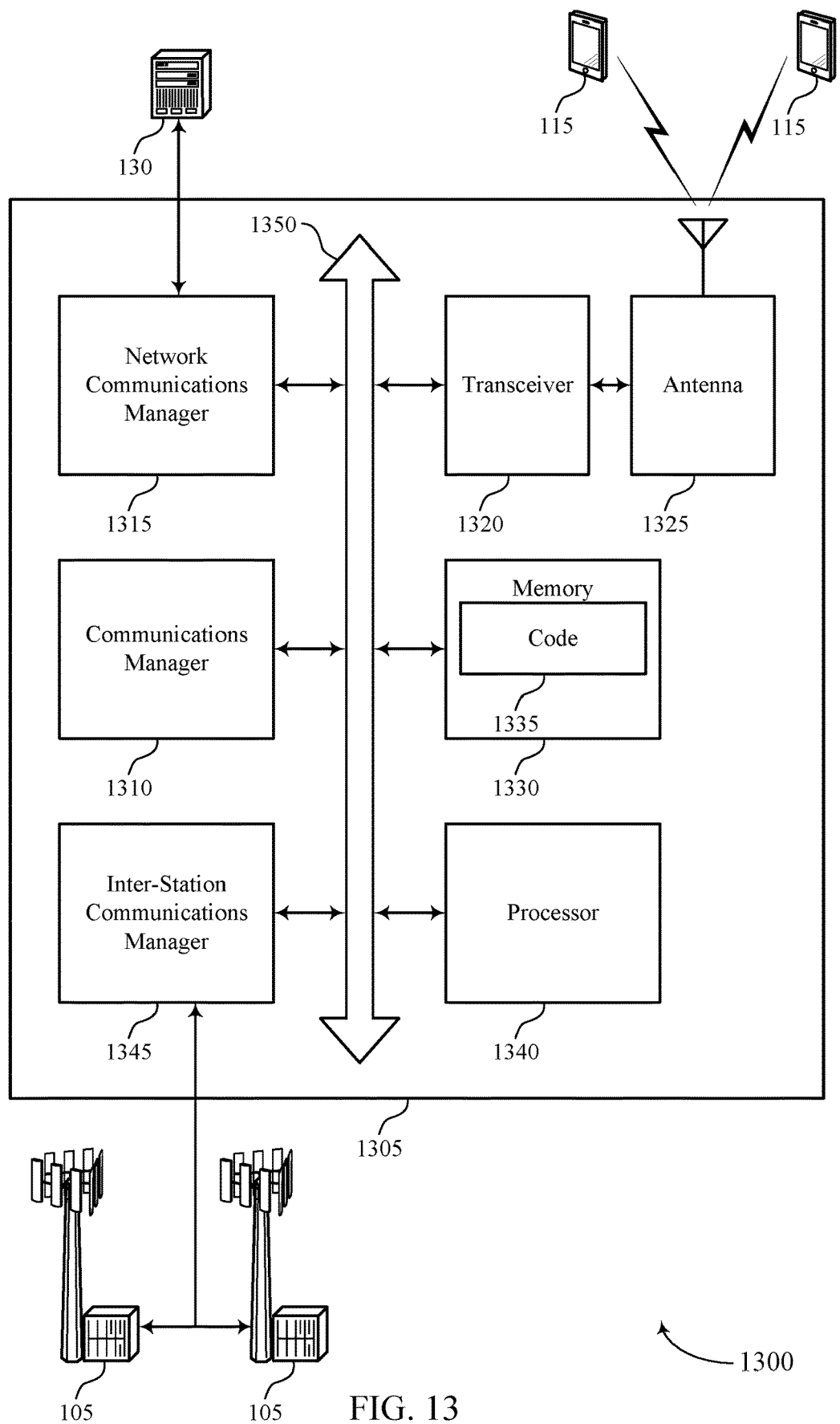
FIG. 13 shows a diagram of a system including a device that supports wireless device cooperative transmission schemes in accordance with aspects of the present disclosure.

FIG. 13 shows a diagram of a system 1300 including a device 1305 that supports wireless device cooperative transmission schemes in accordance with aspects of the present disclosure. The device 1305 may be an example of or include the components of device 1005, device 1105, or a base station 105 as described herein. The device 1305 may include components for bi-directional voice and data communications including components for transmitting and receiving communications, including a communications manager 1310, a network communications manager 1315, a transceiver 1320, an antenna 1325, memory 1330, a processor 1340, and an inter-station communications manager 1345. These components may be in electronic communication via one or more buses (e.g., bus 1350).

The communications manager 1310 may receive, from a first device over a first communication link, an indication that a set of local antennas of the first device and a set of auxiliary antennas of a second device are to be used to transmit uplink signals to the base station, where the first device is in communication with the second device over a second communication link. The communications manager 1310 may transmit a control message to the first device indicating a first configuration for the first device to use to generate first uplink signals for transmission to the base station using the set of local antennas and a second configuration for the first device to use to generate second uplink signals for transmission to the base station using the set of auxiliary antennas. The communications manager 1310 may receive the first uplink signals from the first device and the second uplink signals from the second device based on transmitting the control message.

The network communications manager 1315 may manage communications with the core network 130 (e.g., via one or more wired backhaul links). For example, the network communications manager 1315 may manage the transfer of data communications for client devices, such as one or more UEs 115.

The transceiver 1320 may communicate bi-directionally, via one or more antennas, wired, or wireless links as described above. For example, the transceiver 1320 may represent a wireless transceiver and may communicate bi-directionally with another wireless transceiver. The transceiver 1320 may also include a modem to modulate the packets and provide the modulated packets to the antennas for transmission, and to demodulate packets received from the antennas.

In some cases, the wireless device may include a single antenna 1325. However, in some cases the device may have more than one antenna 1325, which may be capable of concurrently transmitting or receiving multiple wireless transmissions.

The memory 1330 may include RAM, ROM, or a combination thereof. The memory 1330 may store computer-readable code 1335 including instructions that, when executed by a processor (e.g., the processor 1340) cause the device to perform various functions described herein. In some cases, the memory 1330 may contain, among other things, a BIOS which may control basic hardware or software operation such as the interaction with peripheral components or devices.

The processor 1340 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some cases, a memory controller may be integrated into processor 1340. The processor 1340 may be configured to execute computer-readable instructions stored in a memory (e.g., the memory 1330) to cause the device 1305 to perform various functions (e.g., functions or tasks supporting wireless device cooperative transmission schemes).

The inter-station communications manager 1345 may manage communications with other base station 105, and may include a controller or scheduler for controlling communications with UEs 115 in cooperation with other base stations 105. For example, the inter-station communications manager 1345 may coordinate scheduling for transmissions to UEs 115 for various interference mitigation techniques such as beamforming or joint transmission. In some examples, the inter-station communications manager 1345 may provide an X2 interface within an LTE/LTE-A wireless communication network technology to provide communication between base stations 105.

The code 1335 may include instructions to implement aspects of the present disclosure, including instructions to support wireless communications. The code 1335 may be stored in a non-transitory computer-readable medium such as system memory or other type of memory. In some cases, the code 1335 may not be directly executable by the processor 1340 but may cause a computer (e.g., when compiled and executed) to perform functions described herein.

Figure 14:
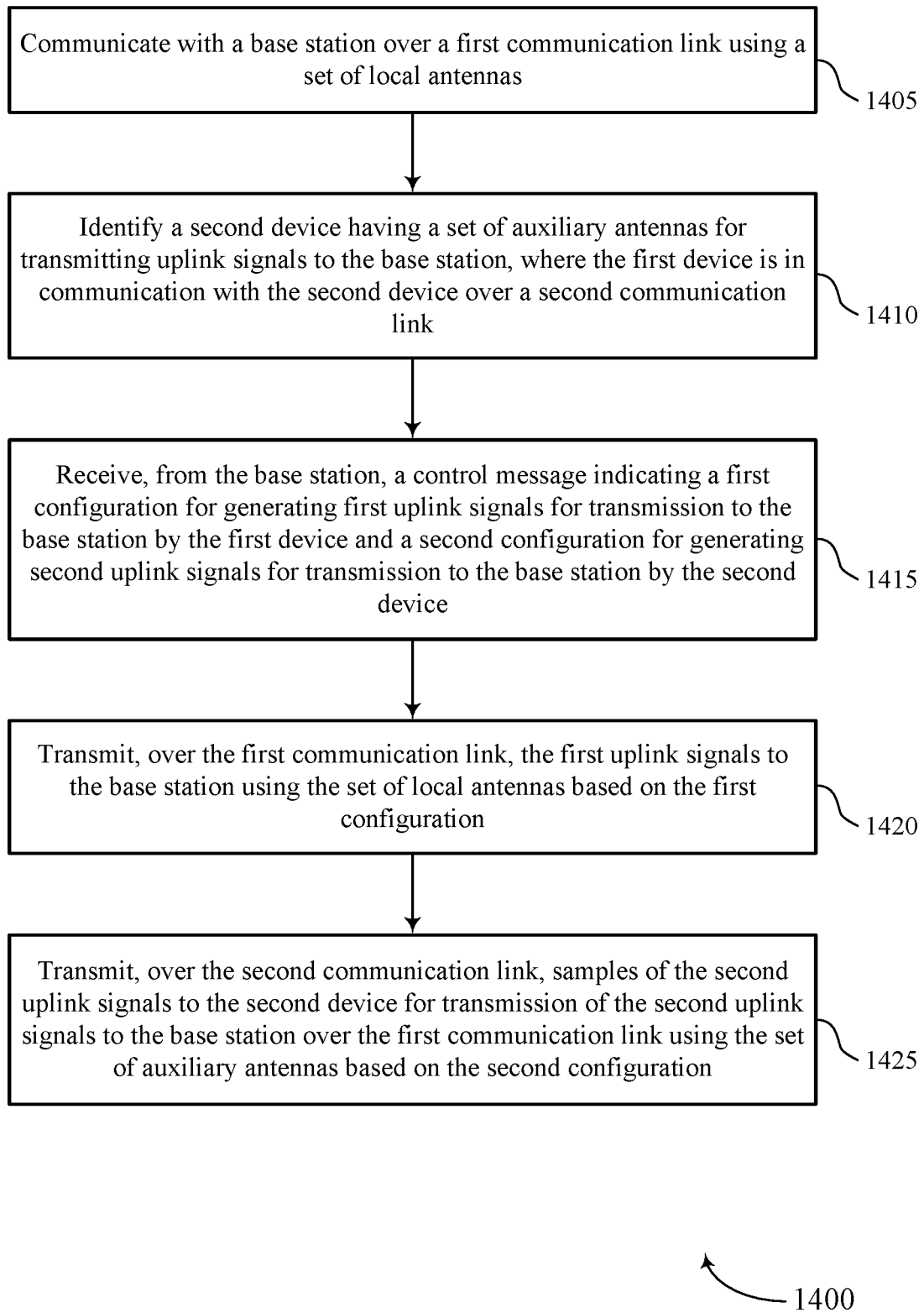
FIGS. 14 through 16 show flowcharts illustrating methods that support wireless device cooperative transmission schemes in accordance with aspects of the present disclosure.

FIG. 14 shows a flowchart illustrating a method 1400 that supports wireless device cooperative transmission schemes in accordance with aspects of the present disclosure. The operations of method 1400 may be implemented by a UE 115 or its components as described herein. For example, the operations of method 1400 may be performed by a communications manager as described with reference to FIGS. 6 through 9. In some examples, a UE may execute a set of instructions to control the functional elements of the UE to perform the functions described below. Additionally, or alternatively, a UE may perform aspects of the functions described below using special-purpose hardware.

At 1405, the UE may communicate with a base station over a first communication link using a set of local antennas. The operations of 1405 may be performed according to the methods described herein. In some examples, aspects of the operations of 1405 may be performed by a local antenna manager as described with reference to FIGS. 6 through 9.

At 1410, the UE may identify a second device having a set of auxiliary antennas for transmitting uplink signals to the base station, where the first device is in communication with the second device over a second communication link. The operations of 1410 may be performed according to the methods described herein. In some examples, aspects of the operations of 1410 may be performed by an auxiliary antenna manager as described with reference to FIGS. 6 through 9.

At 1415, the UE may receive, from the base station, a control message indicating a first configuration for generating first uplink signals for transmission to the base station by the first device and a second configuration for generating second uplink signals for transmission to the base station by the second device. The operations of 1415 may be performed according to the methods described herein. In some examples, aspects of the operations of 1415 may be performed by a configuration manager as described with reference to FIGS. 6 through 9.

At 1420, the UE may transmit, over the first communication link, the first uplink signals to the base station using the set of local antennas based on the first configuration. The operations of 1420 may be performed according to the methods described herein. In some examples, aspects of the operations of 1420 may be performed by a local antenna manager as described with reference to FIGS. 6 through 9.

At 1425, the UE may transmit, over the second communication link, samples of the second uplink signals to the second device for transmission of the second uplink signals to the base station over the first communication link using the set of auxiliary antennas based on the second configuration. The operations of 1425 may be performed according to the methods described herein. In some examples, aspects of the operations of 1425 may be performed by an auxiliary antenna manager as described with reference to FIGS. 6 through 9.

Figure 15:
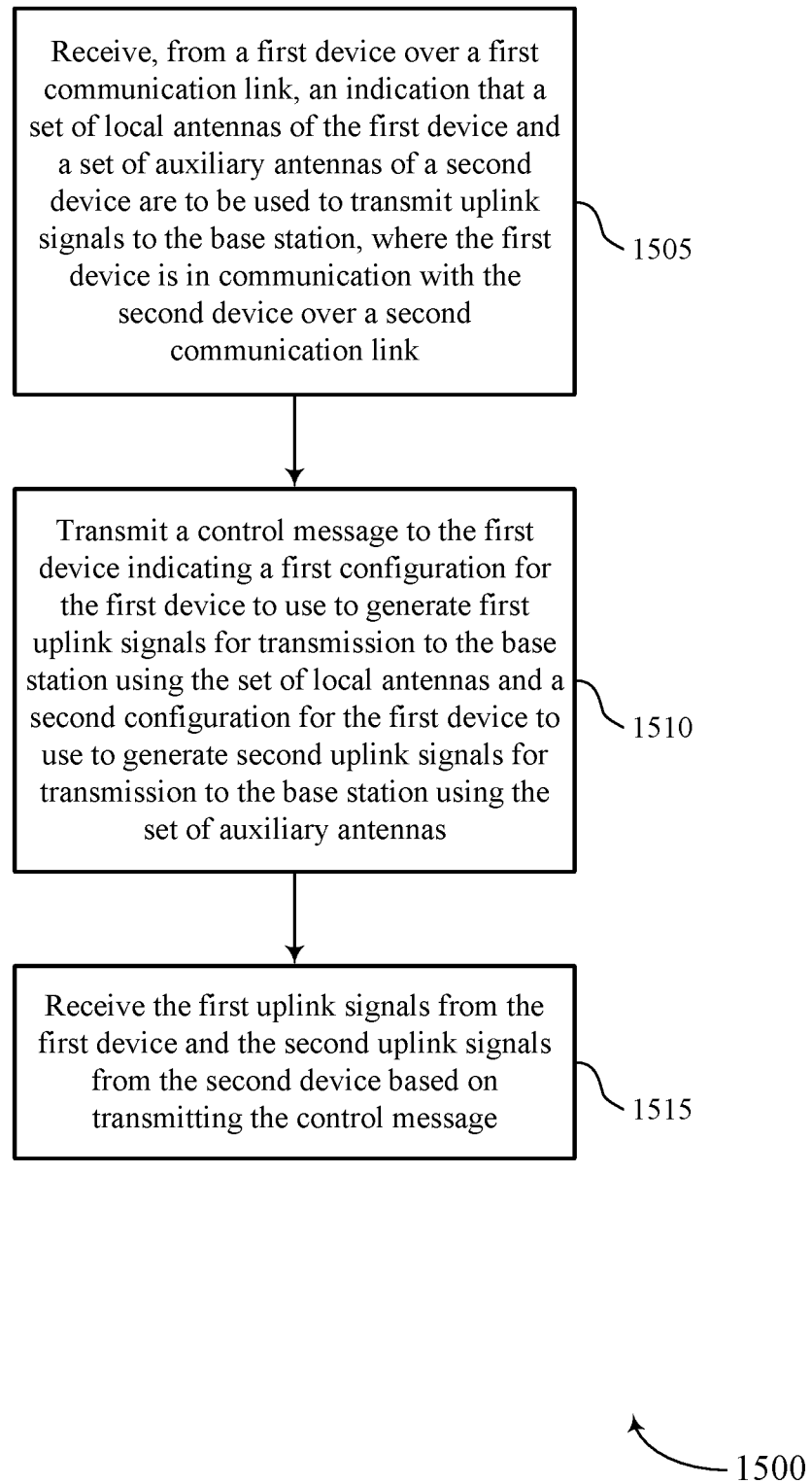

FIG. 15 shows a flowchart illustrating a method 1500 that supports wireless device cooperative transmission schemes in accordance with aspects of the present disclosure. The operations of method 1500 may be implemented by a base station 105 or its components as described herein. For example, the operations of method 1500 may be performed by a communications manager as described with reference to FIGS. 10 through 13. In some examples, a base station may execute a set of instructions to control the functional elements of the base station to perform the functions described below. Additionally, or alternatively, a base station may perform aspects of the functions described below using special-purpose hardware.

At 1505, the base station may receive, from a first device over a first communication link, an indication that a set of local antennas of the first device and a set of auxiliary antennas of a second device are to be used to transmit uplink signals to the base station, where the first device is in communication with the second device over a second communication link. The operations of 1505 may be performed according to the methods described herein. In some examples, aspects of the operations of 1505 may be performed by a UE capability manager as described with reference to FIGS. 10 through 13.

At 1510, the base station may transmit a control message to the first device indicating a first configuration for the first device to use to generate first uplink signals for transmission to the base station using the set of local antennas and a second configuration for the first device to use to generate second uplink signals for transmission to the base station using the set of auxiliary antennas. The operations of 1510 may be performed according to the methods described herein. In some examples, aspects of the operations of 1510 may be performed by a configuration manager as described with reference to FIGS. 10 through 13.

At 1515, the base station may receive the first uplink signals from the first device and the second uplink signals from the second device based on transmitting the control message. The operations of 1515 may be performed according to the methods described herein. In some examples, aspects of the operations of 1515 may be performed by a configuration manager as described with reference to FIGS. 10 through 13.

Figure 16:
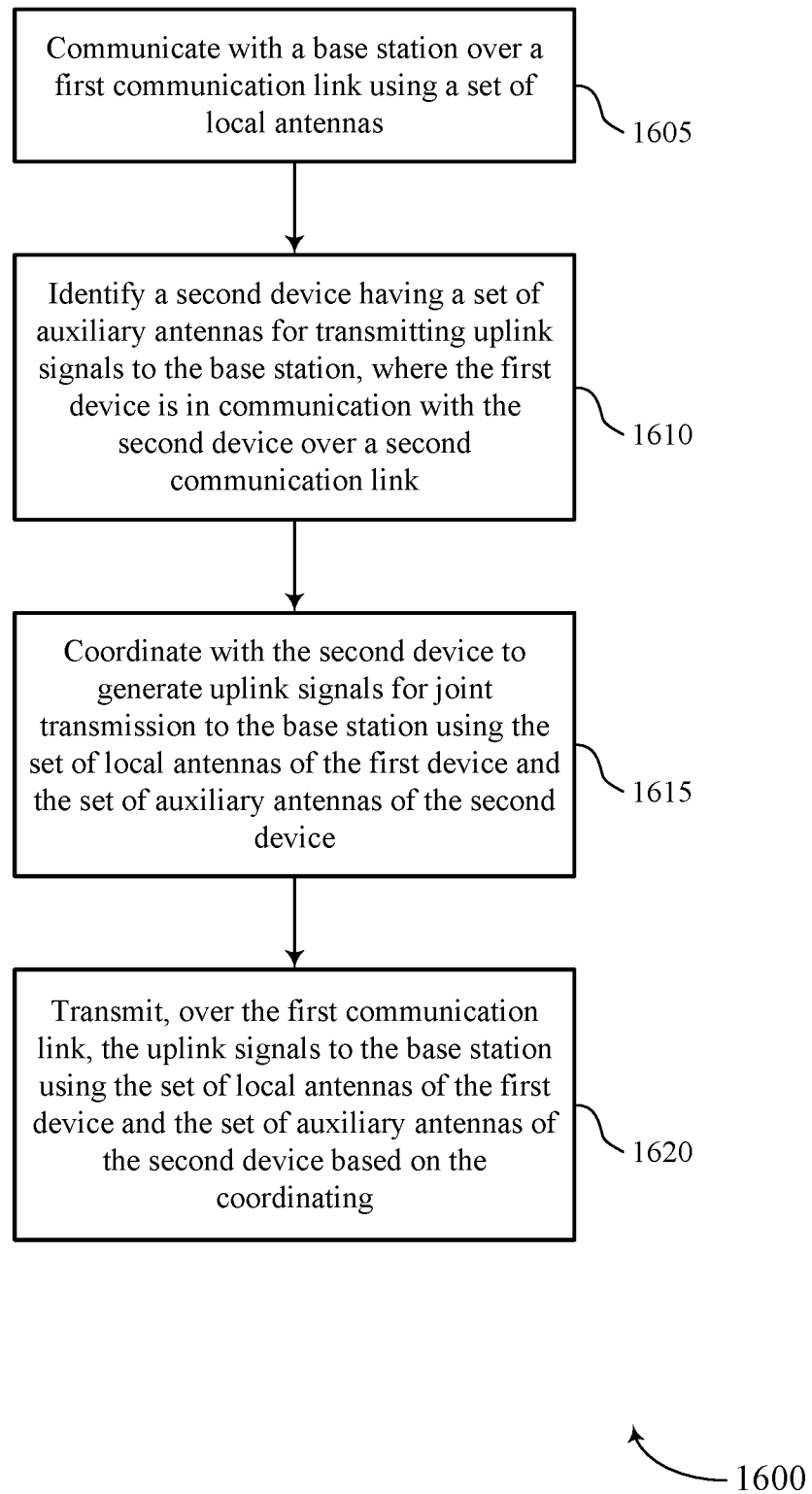

FIG. 16 shows a flowchart illustrating a method 1600 that supports wireless device cooperative transmission schemes in accordance with aspects of the present disclosure. The operations of method 1600 may be implemented by a UE 115 or its components as described herein. For example, the operations of method 1600 may be performed by a communications manager as described with reference to FIGS. 6 through 9. In some examples, a UE may execute a set of instructions to control the functional elements of the UE to perform the functions described below. Additionally, or alternatively, a UE may perform aspects of the functions described below using special-purpose hardware.

At 1605, the UE may communicate with a base station over a first communication link using a set of local antennas. The operations of 1605 may be performed according to the methods described herein. In some examples, aspects of the operations of 1605 may be performed by a local antenna manager as described with reference to FIGS. 6 through 9.

At 1610, the UE may identify a second device having a set of auxiliary antennas for transmitting uplink signals to the base station, where the first device is in communication with the second device over a second communication link. The operations of 1610 may be performed according to the methods described herein. In some examples, aspects of the operations of 1610 may be performed by an auxiliary antenna manager as described with reference to FIGS. 6 through 9.

At 1615, the UE may coordinate with the second device to generate uplink signals for joint transmission to the base station using the set of local antennas of the first device and the set of auxiliary antennas of the second device. The operations of 1615 may be performed according to the methods described herein. In some examples, aspects of the operations of 1615 may be performed by a coordination manager as described with reference to FIGS. 6 through 9.

At 1620, the UE may transmit, over the first communication link, the uplink signals to the base station using the set of local antennas of the first device and the set of auxiliary antennas of the second device based on the coordinating. The operations of 1620 may be performed according to the methods described herein. In some examples, aspects of the operations of 1620 may be performed by a coordination manager as described with reference to FIGS. 6 through 9.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1×, 1×, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a first device, comprising:
    communicating with a base station over a first communication link using a set of local antennas;
    identifying a second device having a set of auxiliary antennas for transmitting uplink signals to the base station, wherein the first device is in communication with the second device over a second communication link;
    receiving, from the base station, a control message indicating a first configuration for generating first uplink signals for transmission to the base station by the first device and a second configuration for generating second uplink signals for transmission to the base station by the second device;
    transmitting, over the first communication link, the first uplink signals to the base station using the set of local antennas based at least in part on the first configuration; and
    transmitting, over the second communication link, samples of the second uplink signals to the second device for transmission of the second uplink signals to the base station over the first communication link using the set of auxiliary antennas based at least in part on the second configuration.

2. The method of claim 1, wherein the first configuration comprises a first modulation order, and the second configuration comprises a second modulation order, the method further comprising:
    modulating the first uplink signals for transmission to the base station by the first device based at least in part on the first modulation order; and
    modulating the second uplink signals for transmission to the base station by the second device based at least in part on the second modulation order.

3. The method of claim 1, wherein the first configuration comprises a first code rate, and the second configuration comprises a second code rate, the method further comprising:
    encoding the first uplink signals for transmission to the base station by the first device based at least in part on the first code rate; and
    encoding the second uplink signals for transmission to the base station by the second device based at least in part on the second code rate.

4. The method of claim 1, wherein the first configuration comprises a first precoder, and the second configuration comprises a second precoder, the method further comprising:
    precoding the first uplink signals for transmission to the base station by the first device using the first precoder; and
    precoding the second uplink signals for transmission to the base station by the second device using the second precoder.

5. The method of claim 4, further comprising:
    receiving, in the control message, a single field indicating a joint precoder of a plurality of joint precoders, the joint precoder comprising the first precoder for the first device and the second precoder for the second device.

6. The method of claim 4, further comprising:
    receiving, in the control message, a first field indicating the first precoder for the first device and a second field indicating the second precoder for the second device.

7. The method of claim 1, wherein the first uplink signals comprise first sounding reference signals, and the second uplink signals comprise second sounding reference signals.

8. The method of claim 7, wherein:
    the first configuration comprises a first sounding reference signal bandwidth, a first sounding reference signal comb size, a first sounding reference signal sequence, a first number of sounding reference signal ports, or any combination thereof; and
    the second configuration comprises a second sounding reference signal bandwidth, a second sounding reference signal comb size, a second sounding reference signal sequence, a second number of sounding reference signal ports, or any combination thereof.

9. The method of claim 7, wherein the first sounding reference signals and the second sounding reference signals are transmitted on different sounding reference signal resources.

10. The method of claim 1, wherein the second communication link comprises universal serial bus (USB) link, a Bluetooth link, a Wi-Fi link, or a fifth generation (5G) sidelink.

11. The method of claim 1, wherein:
the first device is a first user equipment (UE), a first head mounted display, a first extended reality (XR) device, a first augmented reality (AR) device, a first virtual reality (VR) device, or a first wearable device; and
the second device is a second UE, a second head mounted display, a second XR device, a second AR device, a second VR device, or a second wearable device.

12. The method of claim 1, wherein the first device comprises a fifth generation (5G) modem, and the second device comprises an antenna and radio frequency (RF) front-end.

13. The method of claim 1, wherein the samples of the second uplink signals comprise in-phase and quadrature samples of the second uplink signals.

14. A method for wireless communication at a base station, comprising:
receiving, from a first device over a first communication link, an indication that a set of local antennas of the first device and a set of auxiliary antennas of a second device are to be used to transmit uplink signals to the base station, wherein the first device is in communication with the second device over a second communication link;
transmitting a control message to the first device indicating a first configuration for the first device to use to generate first uplink signals for transmission to the base station using the set of local antennas and a second configuration for the first device to use to generate second uplink signals for transmission to the base station using the set of auxiliary antennas; and
receiving the first uplink signals from the first device and the second uplink signals from the second device based at least in part on transmitting the control message.

15. The method of claim 14, wherein the first configuration comprises a first modulation order, and the second configuration comprises a second modulation order, the method further comprising:
demodulating the first uplink signals received from the first device based at least in part on the first modulation order; and
demodulating the second uplink signals received from the second device based at least in part on the second modulation order.

16. The method of claim 14, wherein the first configuration comprises a first code rate, and the second configuration comprises a second code rate, the method further comprising:
decoding the first uplink signals received from the first device based at least in part on the first code rate; and
decoding the second uplink signals received from the second device based at least in part on the second code rate.

17. The method of claim 14, wherein the first configuration comprises a first precoder, and the second configuration comprises a second precoder, the method further comprising:

decoding the first uplink signals received from the first device based at least in part on the first uplink signals being precoded using the first precoder; and
decoding the second uplink signals received from the second device based at least in part on the second uplink signals being precoded using the second precoder.

18. The method of claim 17, further comprising:
transmitting, in the control message, a single field indicating a joint precoder of a plurality of joint precoders, the joint precoder comprising the first precoder for the first device and the second precoder for the second device.

19. The method of claim 17, further comprising:
transmitting, in the control message, a first field indicating the first precoder for the first device and a second field indicating the second precoder for the second device.

20. The method of claim 14, wherein the first uplink signals comprise first sounding reference signals, and the second uplink signals comprise second sounding reference signals.

21. The method of claim 20, wherein:
the first configuration comprises a first sounding reference signal bandwidth, a first sounding reference signal comb size, a first sounding reference signal sequence, a first number of sounding reference signal ports, or a combination thereof; and
the second configuration comprises a second sounding reference signal bandwidth, a second sounding reference signal comb size, a second sounding reference signal sequence, a second number of sounding reference signal ports, or a combination thereof.

22. The method of claim 20, wherein the first sounding reference signals and the second sounding reference signals are transmitted on different sounding reference signal resources.

23. The method of claim 14, wherein the second communication link comprises universal serial bus (USB) link, a Bluetooth link, a Wi-Fi link, or a fifth generation (5G) sidelink.

24. The method of claim 14, wherein:
the first device is a first user equipment (UE), a first head mounted display, a first extended reality (XR) device, a first augmented reality (AR) device, a first virtual reality (VR) device, or a first wearable device; and
the second device is a second UE, a second head mounted display, a second XR device, a second AR device, a second VR device, or a second wearable device.

25. The method of claim 14, wherein the first device comprises a fifth generation (5G) modem, and the second device comprises an antenna and radio frequency (RF) front-end.

26. An apparatus for wireless communication at a first device, comprising:
a processor;
memory coupled with the processor; and
instructions stored in the memory and executable by the processor to cause the apparatus to:
communicate with a base station over a first communication link using a set of local antennas;
identify a second device having a set of auxiliary antennas for transmitting uplink signals to the base station, wherein the first device is in communication with the second device over a second communication link;
receive, from the base station, a control message indicating a first configuration for generating first uplink signals for transmission to the base station by the first device and a second configuration for generating second uplink signals for transmission to the base station by the second device;

transmit, over the first communication link, the first uplink signals to the base station using the set of local antennas based at least in part on the first configuration; and transmit, over the second communication link, samples of the second uplink signals to the second device for transmission of the second uplink signals to the base station over the first communication link using the set of auxiliary antennas based at least in part on the second configuration.

27. The apparatus of claim 26, wherein the first configuration comprises a first modulation order, the second configuration comprises a second modulation order, and the instructions are further executable by the processor to cause the apparatus to:

modulate the first uplink signals for transmission to the base station by the first device based at least in part on the first modulation order; and modulate the second uplink signals for transmission to the base station by the second device based at least in part on the second modulation order.

28. The apparatus of claim 26, wherein the first configuration comprises a first code rate, the second configuration comprises a second code rate, and the instructions are further executable by the processor to cause the apparatus to:

encode the first uplink signals for transmission to the base station by the first device based at least in part on the first code rate; and encode the second uplink signals for transmission to the base station by the second device based at least in part on the second code rate.

29. An apparatus for wireless communication at a base station, comprising:

a processor;

memory coupled with the processor; and instructions stored in the memory and executable by the processor to cause the apparatus to:

receive, from a first device over a first communication link, an indication that a set of local antennas of the first device and a set of auxiliary antennas of a second device are to be used to transmit uplink signals to the base station, wherein the first device is in communication with the second device over a second communication link;

transmit a control message to the first device indicating a first configuration for the first device to use to generate first uplink signals for transmission to the base station using the set of local antennas and a second configuration for the first device to use to generate second uplink signals for transmission to the base station using the set of auxiliary antennas; and receive the first uplink signals from the first device and the second uplink signals from the second device based at least in part on transmitting the control message.

30. The apparatus of claim 29, wherein the first configuration comprises a first modulation order, the second configuration comprises a second modulation order, and the instructions are further executable by the processor to cause the apparatus to:

demodulate the first uplink signals received from the first device based at least in part on the first modulation order; and demodulate the second uplink signals received from the second device based at least in part on the second modulation order.

* * * * *